US012795584B2

(12) United States Patent
Bao et al.

(10) Patent No.: US 12,795,584 B2
(45) Date of Patent: Nov. 10, 2026

(54) ON-DEMAND POSITIONING REFERENCE SIGNAL SELECTION FOR DOUBLE DIFFERENCE POSITIONING SCHEMES

(71) Applicant: QUALCOMM INCORPORATED, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 635 days.

(21) Appl. No.: 18/274,665

(22) PCT Filed: Mar. 17, 2022

(86) PCT No.: PCT/US2022/020724
§ 371 (c)(1),
(2) Date: Jul. 27, 2023

(87) PCT Pub. No.: WO2022/197909
PCT Pub. Date: Sep. 22, 2022

(65) Prior Publication Data

US 2024/0089894 A1 Mar. 14, 2024

(30) Foreign Application Priority Data

Mar. 18, 2021 (GR) .............................. 20210100171

(51) Int. Cl.

| | |
|---|---|
| ***H04W 64/00*** | (2009.01) |
| ***H04B 17/14*** | (2015.01) |
| ***H04L 5/00*** | (2006.01) |

(52) U.S. Cl.
CPC ............ *H04W 64/00* (2013.01); *H04B 17/14* (2015.01); *H04L 5/0051* (2013.01)

(58) Field of Classification Search
CPC ...... H04W 64/00; H04B 17/14; H04L 5/0051; H04L 5/0094; G01S 5/10; G01S 5/0036; G01S 5/0236
See application file for complete search history.

(56) References Cited

U.S. PATENT DOCUMENTS

2016/0223641 A1 8/2016 Cheng et al.
2018/0220392 A1* 8/2018 Ly ............................ G01S 5/10
(Continued)

FOREIGN PATENT DOCUMENTS

CN 108844526 A 11/2018
CN 110146908 A 8/2019
(Continued)

OTHER PUBLICATIONS

European Search Report—EP24188715—Search Authority—Munich—Oct. 10, 2024.
(Continued)

*Primary Examiner* — Kabir A Timory
(74) *Attorney, Agent, or Firm* — Procopio, Cory, Hargreaves & Savitch LLP

(57) ABSTRACT

Techniques are provided for configuring on-demand positioning reference signal (PRS) resources in double difference (DD) positioning methods. An example method for providing an on-demand positioning reference signal request includes receiving a plurality of positioning reference signal measurement values from a target user equipment and at least one reference node, determining one or more on-demand positioning reference signals based at least in part on signal identification information associated with each of the plurality of positioning reference signal mea-
(Continued)

surement values, and sending an indication of the one or more on-demand positioning reference signals to either of the target user equipment, the at least one reference node, or both.

28 Claims, 23 Drawing Sheets

(56) References Cited

U.S. PATENT DOCUMENTS

| | | | |
|---|---|---|---|
| 2018/0343048 A1 | 11/2018 | Radulescu et al. | |
| 2019/0327706 A1 | 10/2019 | Agnihotri et al. | |
| 2020/0374850 A1 | 11/2020 | Khoryaev et al. | |
| 2021/0006329 A1 | 1/2021 | Tidd et al. | |
| 2022/0231805 A1 | 7/2022 | Bao et al. | |
| 2023/0062805 A1* | 3/2023 | Baek | H04L 5/0091 |
| 2023/0299923 A1* | 9/2023 | Yoon | G01S 5/14 370/329 |
| 2024/0015686 A1* | 1/2024 | Rao | H04W 64/00 |

FOREIGN PATENT DOCUMENTS

| | | |
|---|---|---|
| EP | 3910364 A1 | 11/2021 |
| JP | 2012098071 A | 5/2012 |
| WO | 2020143403 A1 | 7/2020 |
| WO | 2022154861 A1 | 7/2022 |

OTHER PUBLICATIONS

CATT: "Discussion on Accuracy Improvements by Mitigating UE RX/TX and/or gNB RX/TX Timing Delays", 3GPP TSG RAN WG1 Meeting #104-e, R1-2100385, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-12, XP051970988, Section 3.2.

International Search Report and Written Opinion—PCT/US2022/020724—ISA/EPO—Dec. 14, 2022.

Lim S., et al., "A New Framework for Server-Based and Thin-Client GNSS Operations for High Accuracy Applications in Surveying and Navigation", GNSS 2007—Proceedings of the 20th International Technical Meeting of The Satellite Division of The Institute of Navigation (ION GNSS 2007), The Institute of Navigation, 8551 Rixlew Lane, Suite 360, Manassas, VA, 20109, USA, Sep. 28, 2007, pp. 2169-2177, XP056010354, p. 2170.

Partial International Search Report—PCT/US2022/020724—ISA/EPO—Jul. 28, 2022.

* cited by examiner

ON-DEMAND POSITIONING REFERENCE SIGNAL SELECTION FOR DOUBLE DIFFERENCE POSITIONING SCHEMES

CROSS-REFERENCE TO RELATED APPLICATIONS

This application is the National Stage of International Application No. PCT/US2022/020724, filed Mar. 17, 2022, entitled "ON-DEMAND POSITIONING REFERENCE SIGNAL SELECTION FOR DOUBLE DIFFERENCE POSITIONING SCHEMES," which claims the benefit of Greek patent application No. 20210100171, filed Mar. 18, 2021, entitled "ON-DEMAND POSITIONING REFERENCE SIGNAL SELECTION FOR DOUBLE DIFFERENCE POSITIONING SCHEMES" both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. In industrial applications, the location of a mobile device may be necessary for asset tracking, robotic control, and other kinematic operations which may require a precise location of an end effector. Existing positioning methods include methods based on measuring radio signals transmitted from a variety of devices including satellite vehicles and terrestrial radio sources in a wireless network such as base stations and access points. Stations in a wireless network may be configured to transmit reference signals to enable mobile device to perform positioning measurements.

SUMMARY

An example method for providing an on-demand positioning reference signal request according to the disclosure includes receiving a plurality of positioning reference signal measurement values from a target user equipment and at least one reference node, determining one or more on-demand positioning reference signals to be measured based at least in part on signal identification information associated with each of the plurality of positioning reference signal measurement values, and sending an indication of the one or more on-demand positioning reference signals to be measured to either of the target user equipment, the at least one reference node, or both.

Implementations of such a method may include one or more of the following features. At least one of the plurality of positioning measurement values received from the target user equipment and the at least one reference node may include a reference signal time difference value associated with a pair of positioning reference signals. At least one of the plurality of positioning measurement values received from the target user equipment and the at least one reference node may include a receive-transmit time difference of at least one positioning reference signal. At least one positioning reference signal measurement value based on the one or more on-demand positioning reference signals to be measured may be received from the target user equipment and the at least one reference node. The method may include determining that at least one measurement value of the at least one positioning reference signal measurement value based on the one or more on-demand positioning reference signals to be measured may be based at least in part on a line of sight path condition between an anchor station and the target user equipment, and a line of sight path condition between the anchor station and the at least one reference node. A positioning reference signal muting pattern may be transmitted to one or more anchor stations. Determining the one or more on-demand positioning reference signals to be measured may include constraining the one or more on-demand positioning reference signals to be measured based on a time window. The indication of the one or more on-demand positioning reference signals to be measured may include assistance data associated with one or more positioning reference signal resources.

An example method for on-demand positioning reference signal selection according to the disclosure includes receiving one or more positioning reference signal measurement values from a target user equipment, selecting a reference node based at least in part on signal identification information associated with each of the one or more positioning reference signal measurement values, determining one or more overlapping positioning reference signals to be measured based at least in part on a coarse location of the target user equipment and a location of the reference node, transmitting an indication of the one or more overlapping positioning reference signals to be measured to either the target user equipment, the reference node, or both, and receiving at least one positioning reference signal measurement value based on the one or more overlapping positioning reference signals to be measured from the target user equipment and the reference node.

Implementations of such a method may include one or more of the following features. The one or more positioning reference signal measurement values received from the target user equipment may include a reference signal time difference value associated with a pair of positioning reference signals. The one or more positioning reference signal measurement values received from the target user equipment may include a receive-transmit time difference of at least one positioning reference signal. Determining the one or more overlapping positioning reference signals to be measured may include determining a line of sight path condition between an anchor station and the target user equipment. One or more positioning reference signal measurement values may be received from the reference node, such that selecting the reference node may include determining an intersection of the signal identification information associated with each of the positioning reference signal measurement values received from the target user equipment and the signal identification information associated with each of the positioning reference signal measurement values received from the reference node. The method may include receiving one or more positioning reference signal measurement values from a plurality of reference nodes, determining a plurality of intersection values based at least in part on the signal identification information associated with each of the positioning reference signal measurement values received by the target user equipment and the signal identification information associated with each of the positioning reference signal measurement values received by the plurality of reference nodes, and selecting the reference node based at least in part on the plurality of intersection values, wherein the reference node is associated with a maximum of the plurality of intersection values. A positioning reference signal muting pattern may be transmitted to one or more base stations based at least in part on the one or more overlapping positioning reference signals. A time window for measuring at least one of the one or more overlapping positioning reference signals to be measured may be determined. The indication of the one or more overlapping positioning reference signals to be measured may include assistance data associated with one or more positioning reference signal resources. At least one measurement value of the at least one positioning reference signal measurement value based on the one or more overlapping positioning reference signals to be measured may be based at least in part on a line of sight path condition between an anchor station and the target user equipment, and a line of sight path condition between the anchor station and the reference node.

An example apparatus according to the disclosure includes a memory, at least one transceiver, at least one processor communicatively coupled to the memory and the at least one transceiver, and configured to receive a plurality of positioning reference signal measurement values from a target user equipment and at least one reference node, determine one or more on-demand positioning reference signals to be measured based at least in part on signal identification information associated with each of the plurality of positioning reference signal measurement values, and send an indication of the one or more on-demand positioning reference signals to be measured to either of the target user equipment, the at least one reference node, or both.

An example apparatus according to the disclosure includes a memory, at least one transceiver, at least one processor communicatively coupled to the memory and the at least one transceiver, and configured to receive one or more positioning reference signal measurement values from a target user equipment, select a reference node based at least in part on signal identification information associated with each of the one or more positioning reference signal measurement values, determine one or more overlapping positioning reference signals to be measured based at least in part on a coarse location of the target user equipment and a location of the reference node, transmit an indication of the one or more overlapping positioning reference signals to be measured to either the target user equipment, the reference node, or both, and receive at least one positioning reference signal measurement value based on the one or more overlapping positioning reference signals to be measured from the target user equipment and the reference node.

Items and/or techniques described herein may provide one or more of the following capabilities, as well as other capabilities not mentioned. Base stations in a communication network may be configured to transmit positioning reference signals. Client stations in the communication network may report positioning reference signal measurements to a network server. The client stations may include a target user equipment and reference nodes. The network server may determine overlapping positioning measurement signals between the network client stations. On-demand positioning reference signal measurement requests may be sent to one or more of the client stations based on the overlapping position measurement signals. The on-demand positioning reference signal measurement requests may increase the number of line of sight positioning reference signals the client stations may receive. The line of sight based measurements improve the quality of double difference time of arrival measurements. The accuracy of position estimates for a target user equipment may be improved. Other capabilities may be provided and not every implementation according to the disclosure must provide any, let alone all, of the capabilities discussed.

DETAILED DESCRIPTION

Techniques are discussed herein for configuring on demand positioning reference signal (PRS) resources in double difference (DD) positioning methods. For example, in a DD positioning method a target user equipment (UE) and a reference node may each receive positioning reference signals (PRSs) transmitted by a plurality of stations. The reference node may be a user equipment, or another station such as a base station (BS) configured to receive PRSs and communicate with a wireless network. The reference node is in a known location relative to the transmitting stations and thus the time of flight for signals sent between a station and a reference node via a line of sight (LOS) path are also known. The use of the reference node enables the network to mitigate the impact of timing errors (e.g., sync errors, group delays) which may reduce the accuracy of position measurements obtained by the target UE. DD positioning methods may, however, be impacted by noise associated with non-line of sight (NLOS) signals received by the target UE and the reference nodes. The techniques provided herein utilize on-demand PRS measurement request messages to reduce the errors associated with NLOS noise. For example, the on-demand PRS measurement requests may be used to increase the overlap in common LOS PRS measurements between the target UE and one or more reference nodes. The accuracy of position estimates for the target UE may improve with increases in common PRS measurement overlap. These techniques and configurations are examples, and other techniques and configurations may be used.

Figure 1:
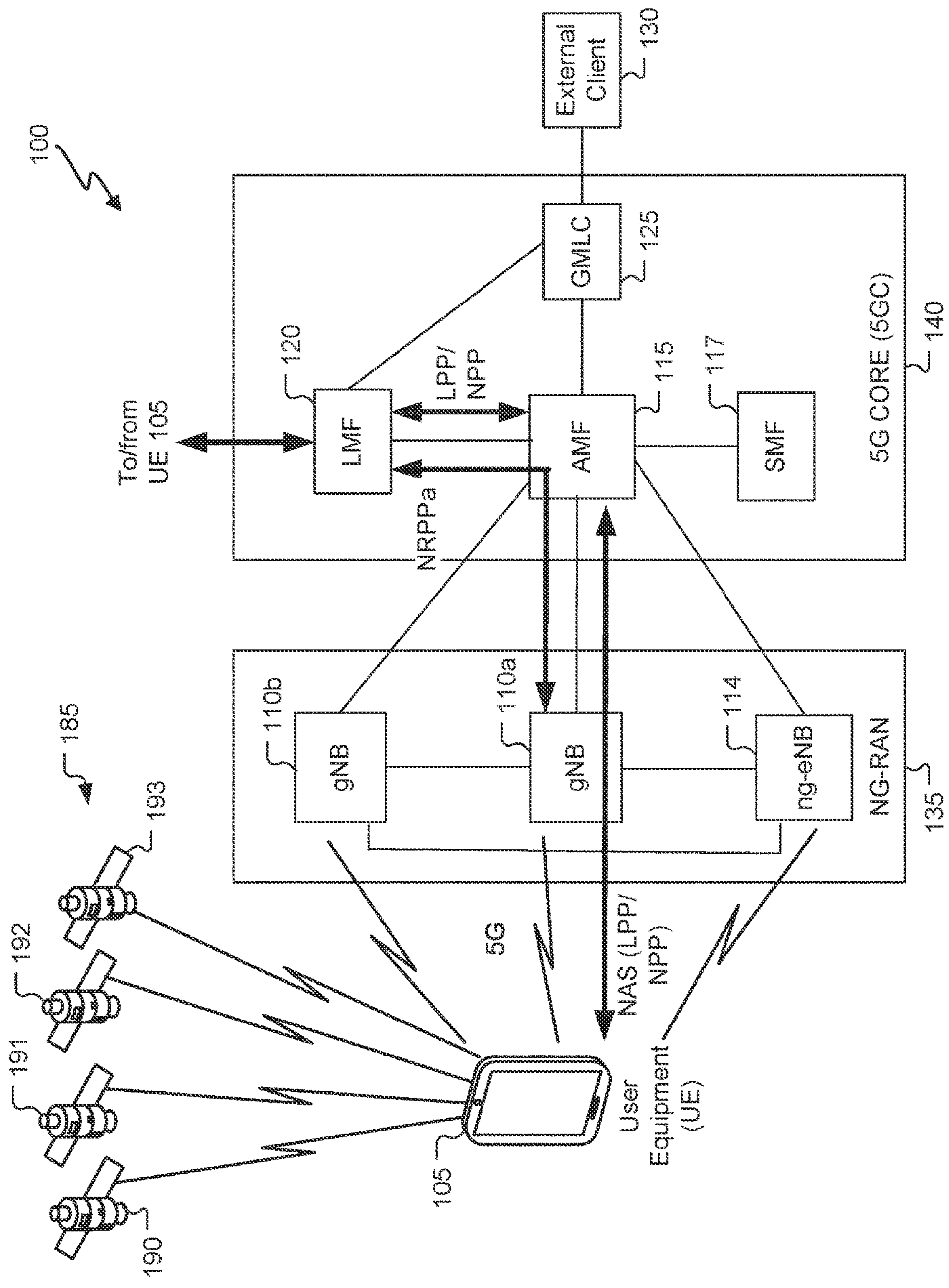
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS).

Additional components of the communication system 100 are described below. The communication system 100 may include additional or alternative components.

As shown in FIG. 1, the NG-RAN 135 includes NR nodeBs (gNBs) 110*a*, 110*b*, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110*a*, 110*b* and the ng-eNB 114 are communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110*a*, 110*b*, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 100*a*, 110*b*, and/or the ng-eNB 114. Other UEs in such a group may be outside such geographic coverage areas or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g., the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs (e.g., gNB 110*a*, gNB 110*b*, ng-eNB 114) may each comprise one or more TRPs. For example, each sector within a cell of a BS may comprise a TRP, although multiple TRPs may share one or more components (e.g., share a processor but have separate antennas). The communication system 100 may include macro TRPs or the communication system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though one of these connections may be supported by the 5GC 140 in some implementations.

As further illustrated in FIG. 1, the LMF 120 may communicate with the gNBs 110*a*. 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT). Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS). WLAN, E-CID, and/or OTDOA (or some other position method). In the case of E-CID, the LPP or NPP message may instruct the UE 105 to obtain one or more measurement quantities (e.g., beam ID, beam width, mean angle, RSRP. RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF

115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
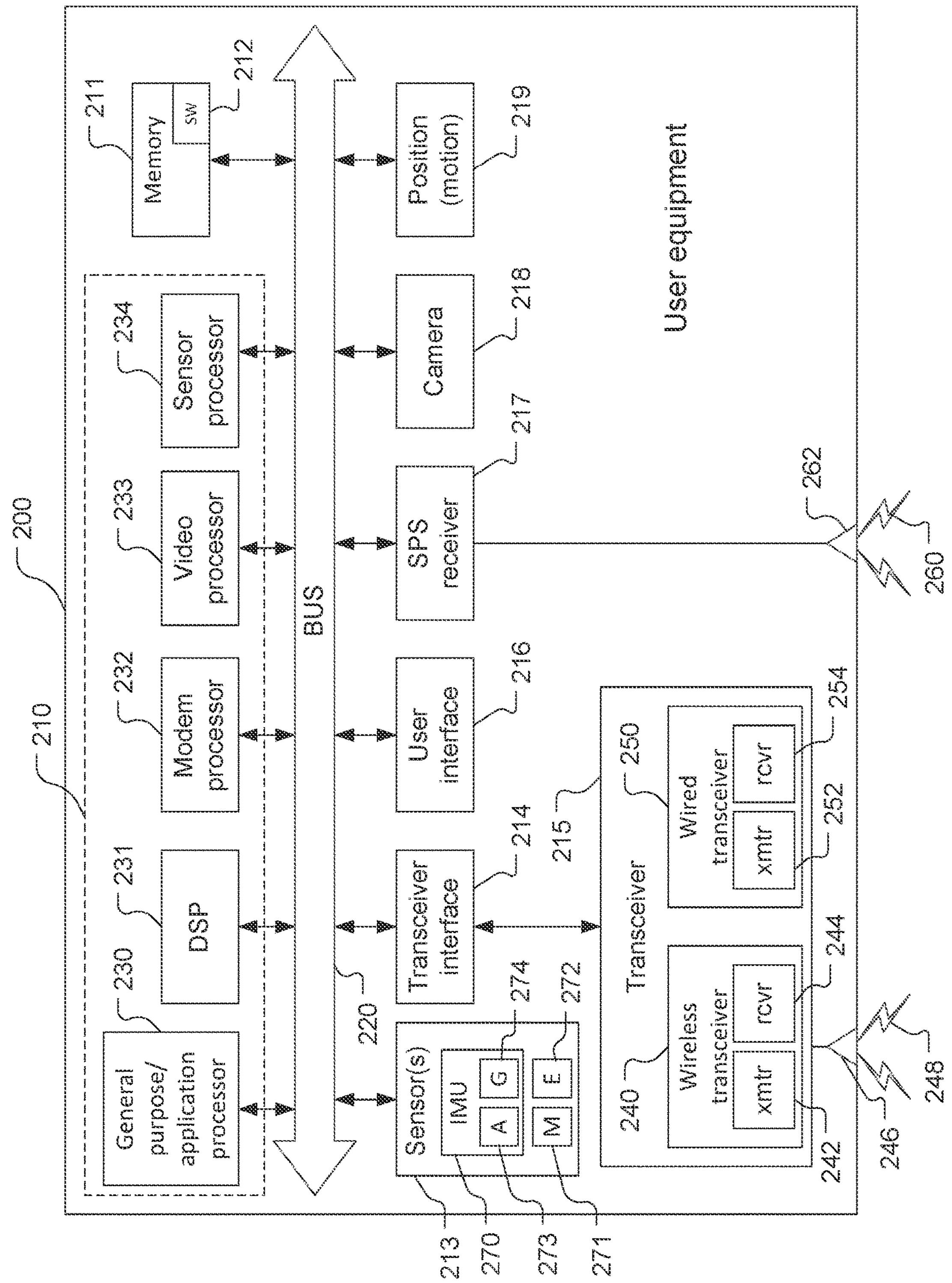
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatuses (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/

IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer (s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR). GSM (Global System for Mobiles), UMTS (Universal Mobile Telecommunications System). AMPS (Advanced Mobile Phone System), CDMA (Code Division Multiple Access). WCDMA (Wideband CDMA), LTE (Long-Term Evolution), LTE Direct (LTE-D), 3GPP LTE-V2X (PC5), V2C (Uu), IEEE 802.11 (including IEEE 802.11p), WiFi, WiFi Direct (WiFi-D), Bluetooth®, Zigbee etc. NR systems may be configured to operate on different frequency layers such as FR1 (e.g., 410-7125 MHz) and FR2 (e.g., 24.25-52.6 GHz), and may extend into new bands such as sub-6 GHz and/or 100 GHz and higher (e.g., FR2x, FR3, FR4). The wired transceiver 250 may include a transmitter 252 and a receiver 254 configured for wired communication, e.g., with the NG-RAN 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown). e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
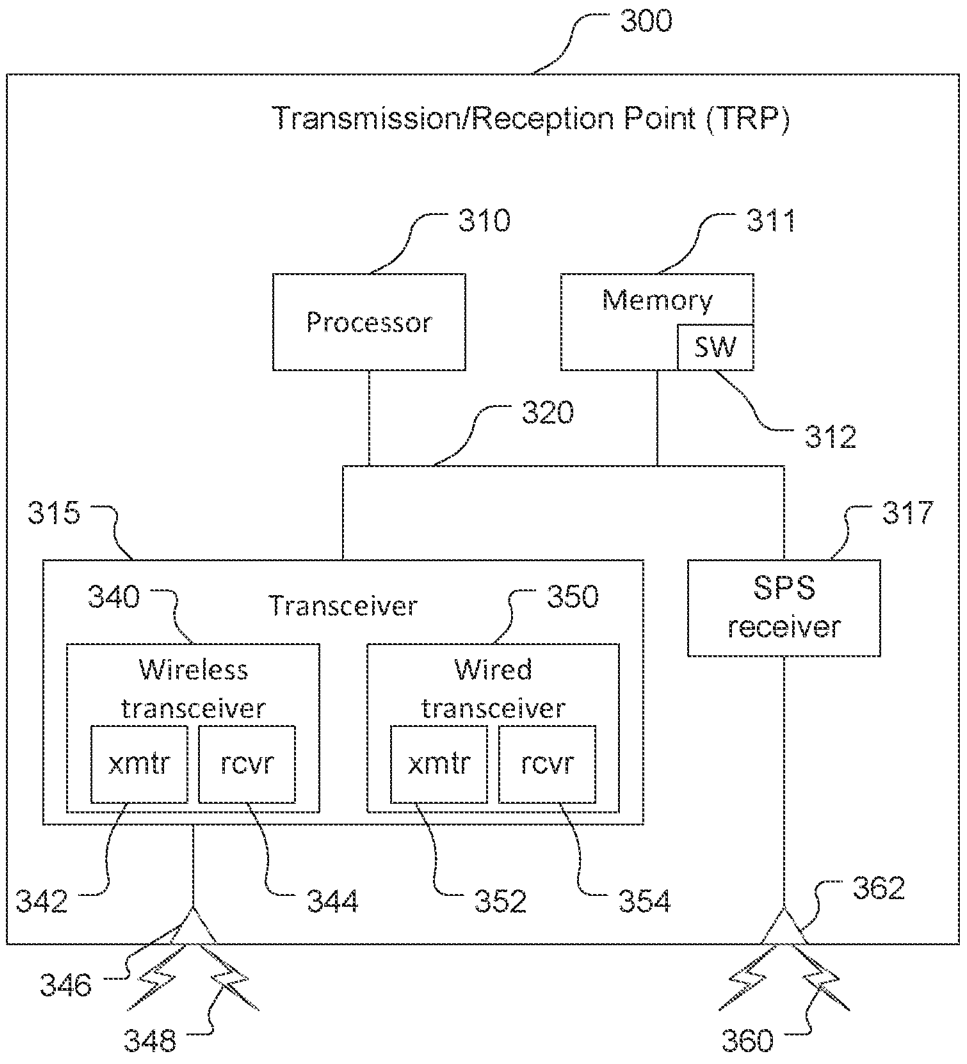
FIG. 3 is a block diagram of components of an example transmission/reception point shown in FIG. 1.

Referring also to FIG. 3, an example of a TRP 300 of the BSs (e.g., gNB 110*a*, gNB 110*b*, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatuses (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of gNB 110*a*, gNB 110*b*, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120 or another network server, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
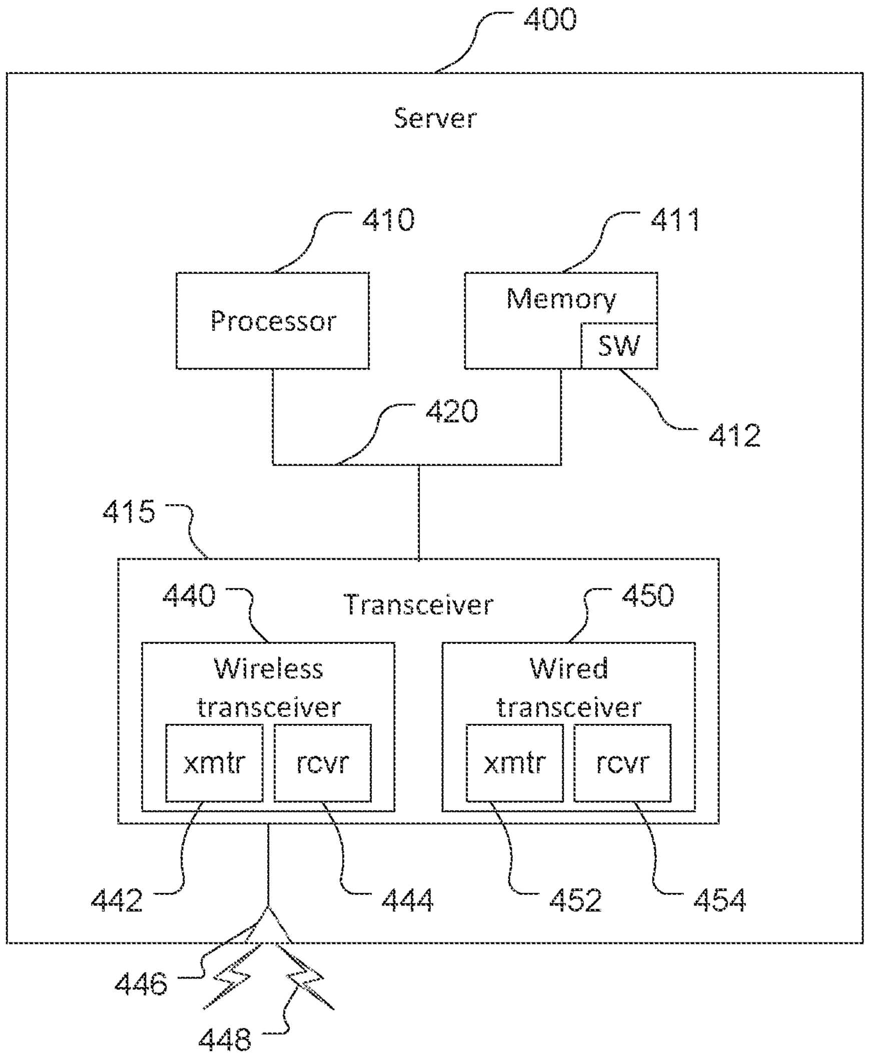
FIG. 4 is a block diagram of components of an example server shown in FIG. 1.

Referring also to FIG. 4, an example server, such as the LMF 120, comprises a computing platform including a processor 410, memory 411 including software (SW) 412, and a transceiver 415. The processor 410, the memory 411, and the transceiver 415 may be communicatively coupled to each other by a bus 420 (which may be configured. e.g., for optical and/or electrical communication). One or more of the shown apparatuses (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also, or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5A:
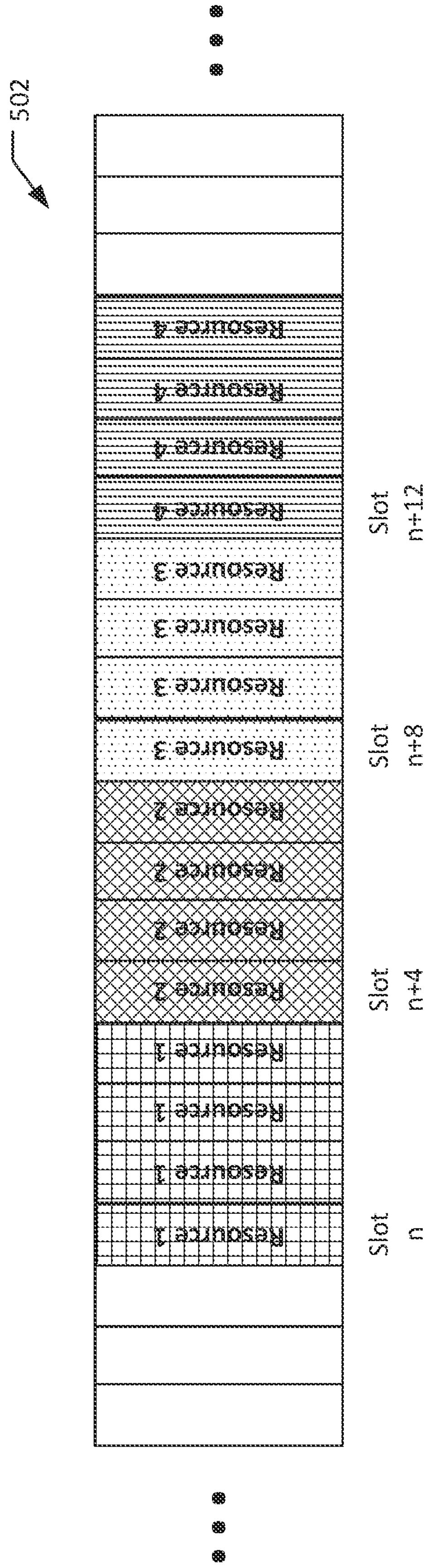
FIGS. 5A and 5B illustrate example downlink positioning reference signal resource sets.
Figure 5B:
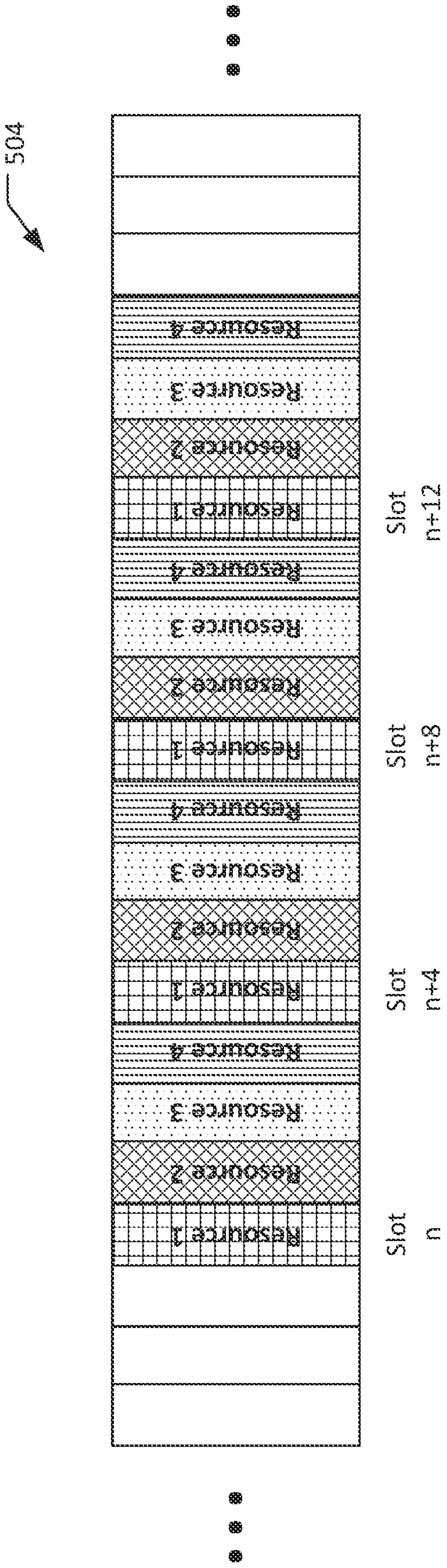

Referring to FIGS. 5A and 5B, example downlink PRS resource sets are shown. In general, a PRS resource set is a collection of PRS resources across one base station (e.g., TRP 300) which have the same periodicity, a common muting pattern configuration and the same repetition factor across slots. A first PRS resource set 502 includes 4 resources and a repetition factor of 4, with a time-gap equal to 1 slot. A second PRS resource set 504 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a PRS resource corresponding to the same PRS resource ID within a single instance of the PRS resource set (e.g., values of 1, 2, 4, 8, 16, 32). The time duration spanned by one PRS resource set containing repeated PRS resources does not exceed PRS-periodicity. The repetition of a PRS resource enables receiver beam sweeping across repetitions and combining RF gains to increase coverage. The repetition may also enable intra-instance muting.

Figure 6:
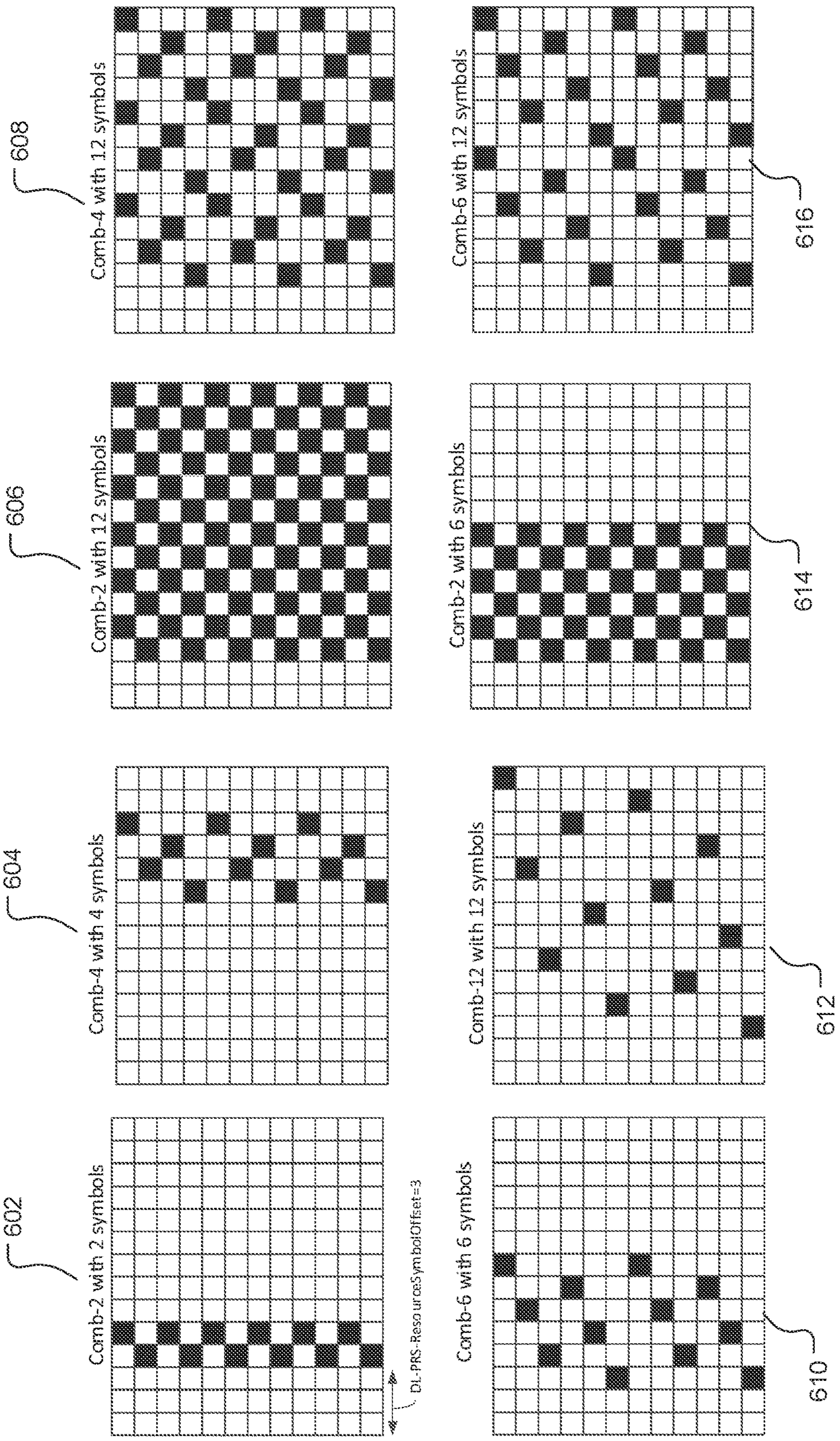
FIG. 6 is an illustration of example subframe formats for positioning reference signal transmission.

Referring to FIG. 6, example subframe and slot formats for positioning reference signal transmissions are shown. The example subframe and slot formats are included in the PRS resource sets depicted in FIGS. 5A and 5B. The subframes and slot formats in FIG. 6 are examples and not limitations and include a comb-2 with 2 symbols format 602, a comb-4 with 4 symbols format 604, a comb-2 with 12 symbols format 606, a comb-4 with 12 symbols format 608, a comb-6 with 6 symbols format 610, a comb-12 with 12 symbols format 612, a comb-2 with 6 symbols format 614, and a comb-6 with 12 symbols format 616. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the PRS over a particular PRS bandwidth, which may be configured by higher layers. The base station may transmit the PRS on subcarriers spaced apart across the PRS bandwidth. The base station may also transmit the PRS based on the parameters such as PRS periodicity TPRS, subframe offset PRS, and PRS duration NPRS. PRS periodicity is the periodicity at which the PRS is transmitted. The PRS periodicity may be, for example, 160, 320, 640 or 1280 ins. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity TPRS and the subframe offset PRS may be conveyed via a PRS configuration index IPRS. The PRS configuration index and the PRS duration may be configured independently by higher layers. A set of NPRS consecutive subframes in which the PRS is transmitted may be referred to as a PRS occasion. Each PRS occasion may be enabled or muted, for example, the UE may apply a muting bit to each cell. A PRS resource set is a collection of PRS resources across a base station which have the same periodicity, a common muting pattern configuration, and the same repetition factor across slots (e.g., 1, 2, 4, 6, 8, 16, 32 slots).

In general, the PRS resources depicted in FIGS. 5A and 5B may be a collection of resource elements that are used for transmission of PRS. The collection of resource elements can span multiple physical resource blocks (PRBs) in the frequency domain and N (e.g., 1 or more) consecutive symbol(s) within a slot in the time domain. In a given OFDM symbol, a PRS resource occupies consecutive PRBs. A PRS resource is described by at least the following parameters; PRS resource identifier (ID), sequence ID, comb size-N, resource element offset in the frequency domain, starting slot and starting symbol, number of symbols per PRS resource (i.e., the duration of the PRS resource), and QCL information (e.g., QCL with other DL reference signals). Currently, one antenna port is supported. The comb size indicates the number of subcarriers in each symbol carrying PRS. For example, a comb-size of comb-4 means that every fourth subcarrier of a given symbol carries PRS.

A PRS resource set is a set of PRS resources used for the transmission of PRS signals, where each PRS resource has a PRS resource ID. In addition, the PRS resources in a PRS resource set are associated with the same transmission-reception point (e.g., a TRP 300). Each of the PRS resources in the PRS resource set have the same periodicity, a common muting pattern, and the same repetition factor across slots. A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. Note that this does not have any implications on whether the base stations and the beams on which PRS are transmitted are known to the UE.

Figure 7:
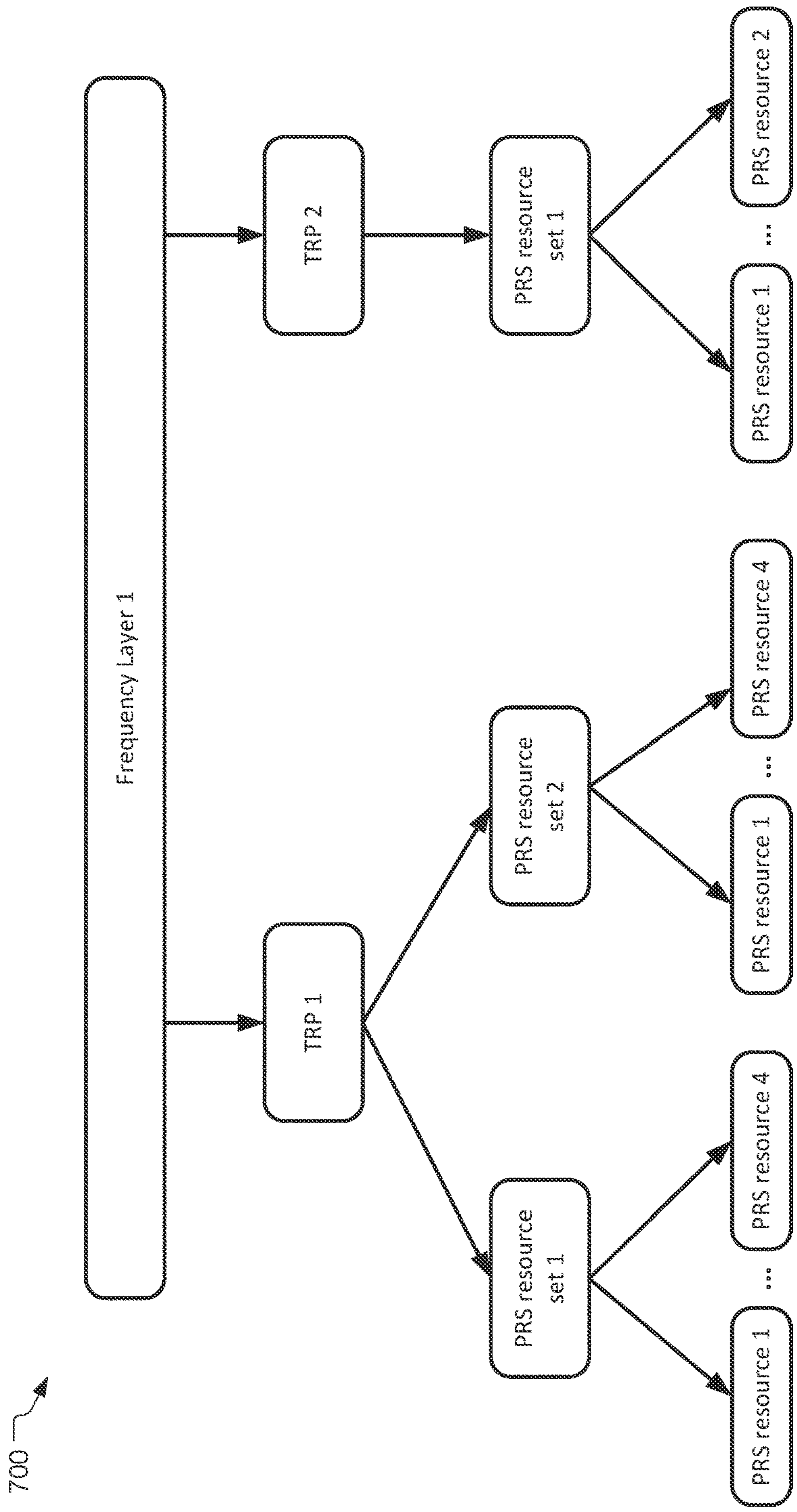
FIG. 7 is a diagram of an example frequency layer.

Referring to FIG. 7, a diagram of an example frequency layer 700 is shown. In an example, the frequency layer 700 also referred to as a positioning frequency layer, may be a collection of PRS resource sets across one or more TRPs. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH may be supported for PRS. Each of the PRS resource sets in the frequency layer 700 is a collection of PRS resources across one TRP which have the same periodicity, a common muting pattern configuration, and the same repetition factor across slots.

Note that the terms positioning reference signal and PRS are reference signals that can be used for positioning, such as but not limited to, PRS signals, navigation reference signals (NRS) in 5G, downlink position reference signals (DL-PRS), uplink position reference signals (UL-PRS), tracking reference signals (TRS), cell-specific reference signals (CRS), channel state information reference signals (CSI-RS), primary synchronization signals (PSS), secondary synchronization signals (SSS), sounding reference signals (SRS), etc.

The ability of a UE to process PRS signals may vary based on the capabilities of the UE. In general, however, industry standards may be developed to establish a common PRS capability for UEs in a network. For example, an industry standard may require that a duration of DL PRS symbol in units of milliseconds (ms) a UE can process every T ms assuming a maximum DL PRS bandwidth in MHz, which is supported and reported by UE. As examples, and not limitations, the maximum DL PRS bandwidth for the FR1 bands may be 5, 10, 20, 40, 50, 80, 100 MHz, and for the FR2 bands may be 50, 100, 200, 400 MHz. The standards may also indicate a DL PRS buffering capability as a Type 1 (i.e., sub-slot/symbol level buffering), or a Type 2 (i.e., slot level buffering). The common UE capabilities may indicate a duration of DL PRS symbols N in units of ms a UE can process every T ms assuming maximum DL PRS bandwidth in MHz, which is supported and reported by a UE. Example T values may include 8, 16, 20, 30, 40, 80, 160, 320, 640, 1280 ms, and example N values may include 0.125, 0.25, 0.5, 1, 2, 4, 6, 8, 12, 16, 20, 25, 30, 32, 35, 40, 45, 50 ms. A UE may be configured to report a combination of (N. T) values per band, where N is a duration of DL PRS symbols in ms processed every T ms for a given maximum bandwidth (B) in MHz supported by a UE. In general, a UE may not be expected to support a DL PRS bandwidth that exceeds the reported DL PRS bandwidth value. The UE DL PRS processing capability may be defined for a single positioning frequency layer 700. The UE DL PRS processing capability may be agnostic to DL PRS comb factor configurations such as depicted in FIG. 6. The UE processing capability may indicate a maximum number of DL PRS resources that a UE can process in a slot under it. For example, the maximum number for FR1 bands may be 1, 2, 4, 6, 8, 12, 16, 24, 32, 48, 64 for each SCS: 15 kHz, 30 kHz, 60 kHz, and the maximum number for the FR2 bands may be 1, 2, 4, 6, 8, 12, 16, 24, 32, 48, 64 for each SCS: 15 kHz, 30 kHz, 60 kHz, 120 kHz.

Figure 8:
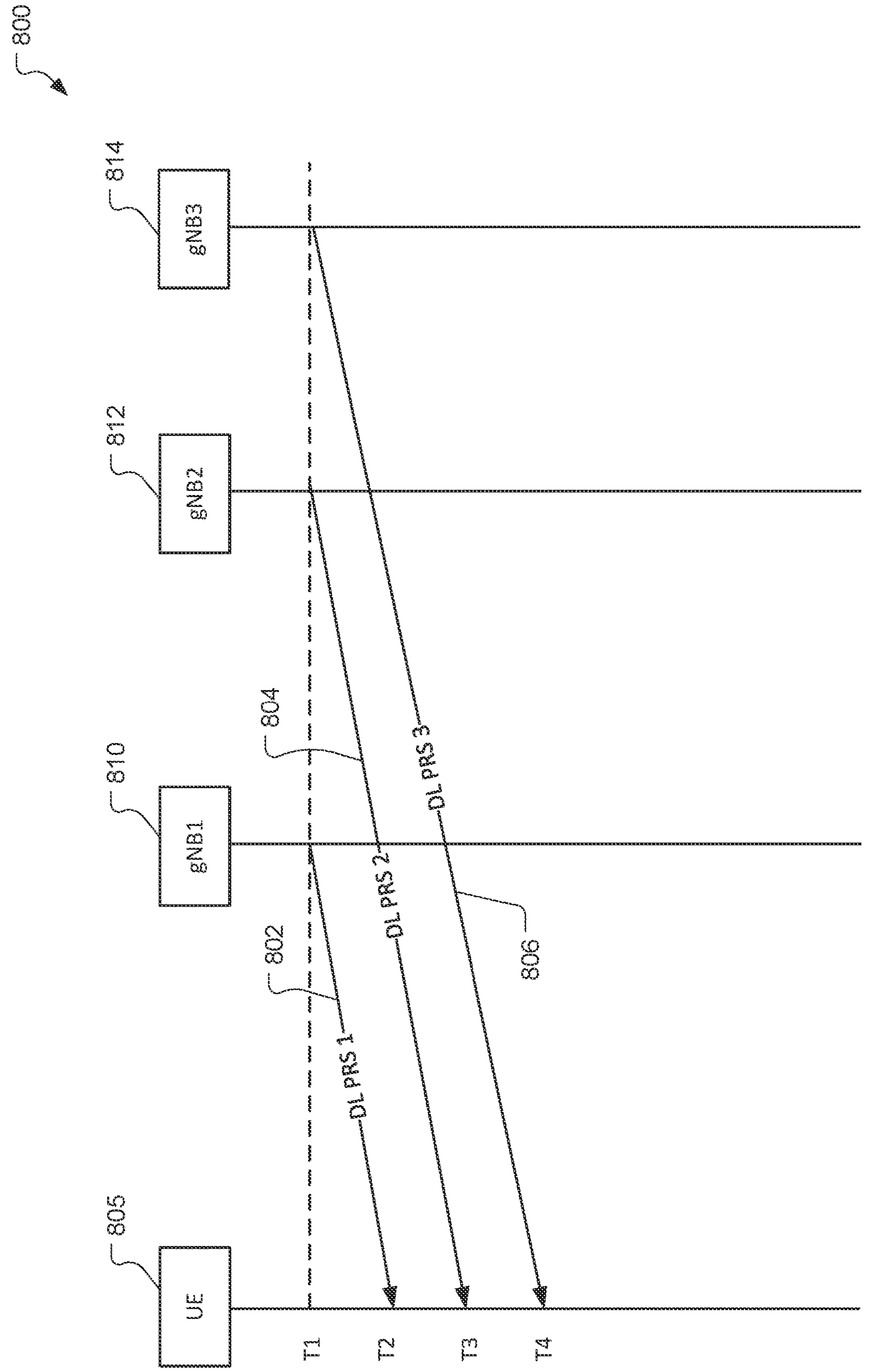
FIG. 8 is an example message flow for a time of arrival based position estimate.

Referring to FIG. 8, an example message flow 800 for time of arrival (ToA) based position flow between a user equipment 805 and a plurality of base stations is shown. The UE 805 is an example of the UE 105, 200 and a first base station 810, a second base station 812 and a third base station 814 are examples of a gNB 110*a-b* or ng-eNB 114. The number of base stations and message formats in the message flow 800 are examples and not limitations as other numbers and formats may be used. ToA based positioning methods utilize the precise measurements of the arrival time of signals transmitted from one or more base stations to a user equipment, or vice versa. For example, the first base station 810 may be configured to transmit a first DL PRS 802 at time T1, the second base station 812 may be configured to transmit a second DL PRS 804 at time T1, and the third base station 814 may be configured to transmit a third DL PRS 806 at time T1. The transmit times and signal format are examples to describe the concepts of ToA lateration techniques. The distance between the UE 805 and the respective base stations 810, 812, 814 is based on the propagation time of the respective PRS signals 802, 804, 806. That is, the signals travel with a known velocity (e.g., approximately the speed of light (c) or ~300 meters per microsecond), and the distance can be determined from the elapsed propagation time. ToA based positioning requires precise knowledge of the transmission start time(s), and that all stations are accurately synchronized with a precise time source. Using the propagation speed and measured time, a distance (D)

between the UE 805 and respective base station may be expressed as:

$$D = c * (t) \quad (1)$$

where:

D=distance (meters);

c=propagation speed of ~300 meters/microsecond;

t=time in microseconds.

For example, the distance between the UE 805 and the first base station 810 is c*(T2–T1), the distance between the UE 805 and the second base station 812 is c*(T3–T1), and the distance between the UE 805 and the third base station 814 is c*(T4–T1). The stations may use other transmission times (i.e., not all stations must transmit at time T1). Using the respective distances as a radius, a circular representation of the area around the base stations may be used to determine a position estimate for the UE 805 (e.g., using trilateration). Additional stations may be used (e.g., using multilateration techniques). ToA positioning methods may be used for two-dimensional as well as three-dimensional position estimates. Three-dimensional resolution can be performed by constructing spherical instead of circular models.

A drawback of ToA positioning methods is the requirement for precise time synchronization of all stations. Even small issues with time synchronization may result in very large errors in the resulting positioning estimates. For example, a time measurement error as small as 100 nanoseconds can result in a localization error of 30 meters. ToA-based positioning solutions are particularly susceptible to outages in station timing sources which may cause a base station to lose time synchronization. Other positioning techniques, such as round trip timing (RTT) and Angle of Arrival (AoA) are less dependent on station time synchronization.

Figure 9:
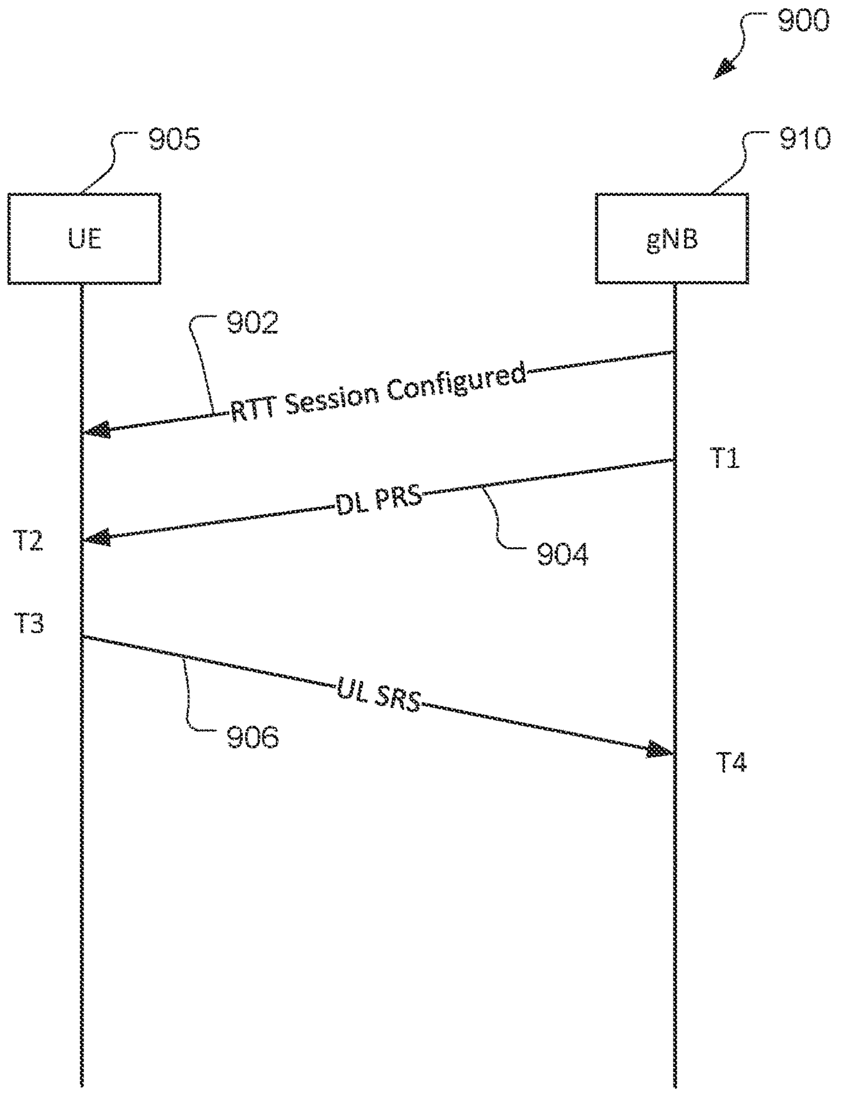
FIG. 9 is an example round trip time message flow between a user equipment and a base station.

Referring to FIG. 9, an example round trip message flow 900 between a user equipment 905 and a base station 910 is shown. The UE 905 is an example of the UE 105, 200 and the base station 910 may be a gNB 110*a-b* or ng-eNB 114. In general, RTT positioning methods utilize a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. The example message flow 900 may be initiated by the base station 910 with a RTT session configured message 902. The base station may utilize the LPP/NRPPa messaging to configure the RTT session. At time T1, the base station 910 may transmit a DL PRS 904, which is received by the UE 905 at time T2. In response, the UE 905 may transmit a Sounding Reference Signal (SRS) for positioning message 906 at time T3 which is received by the base station 910 at time T4. The distance between the UE 905 and the base station 910 may be computed as:

$$\text{distance} = \frac{c}{2}((T4 - T1) - (T3 - T2)) \quad (2)$$

-continued where $c$ = speed of light.

Since the UE 905 and base station 910 are exchanging messages, which may include timing information, the impact of a timing offset between the stations may be minimized. That is, the RTT procedures may be used in asynchronous networks. A drawback to RTT procedures, however, is that in dense operating environments, where there are many UEs exchanging RTT messages with base stations, the bandwidth required for the UL SRS for positioning messages may increase the messaging overhead and utilize excess network bandwidth. In this use case, passive positioning techniques may reduce the bandwidth required for positioning by eliminating transmissions from the UE.

Figure 10:
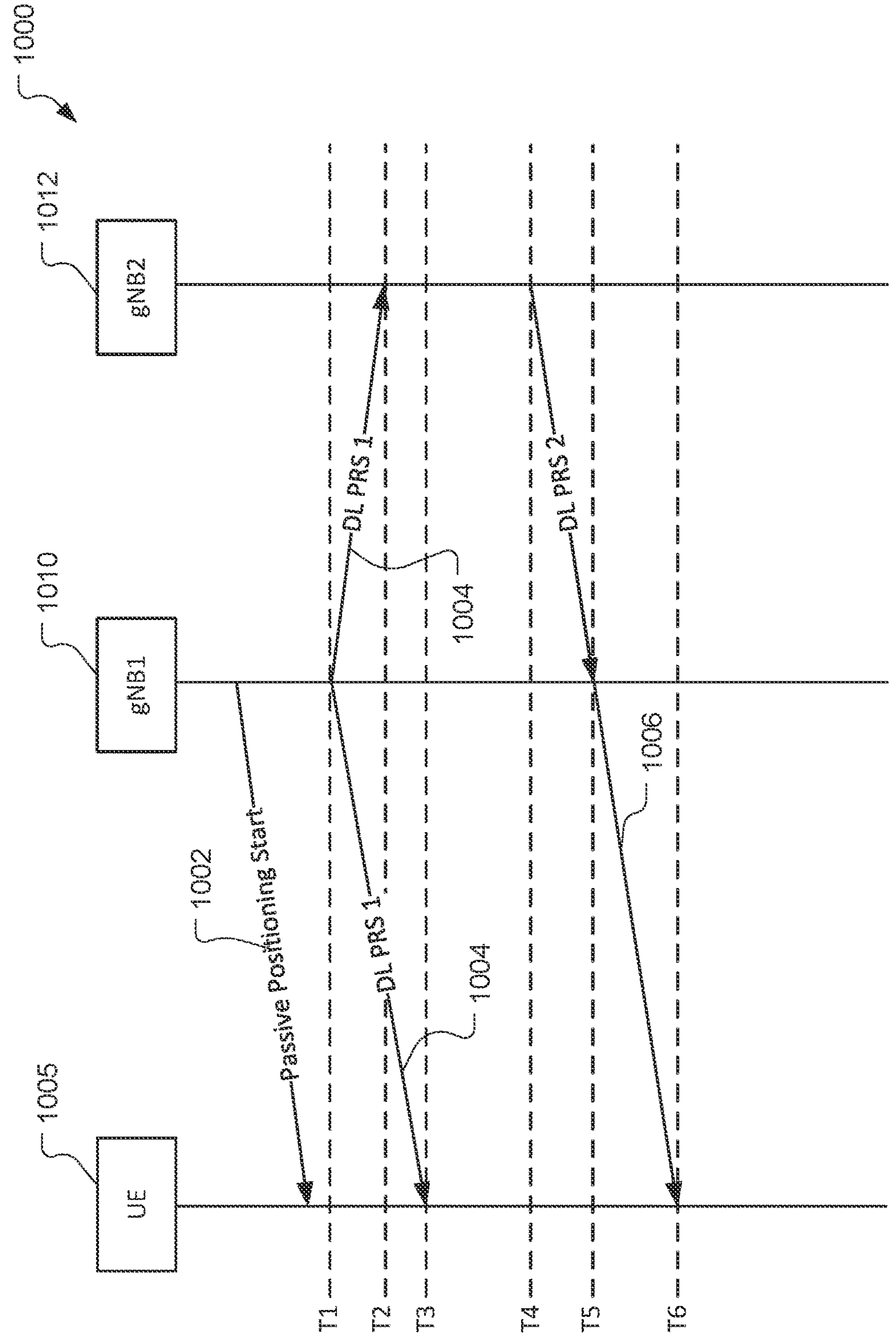
FIG. 10 is an example message flow for passive positioning of a user equipment.

Referring to FIG. 10, an example message flow 1000 for passive positioning of a user equipment 1005 is shown. The message flow includes the UE 1005, a first base station 1010 and a second base station 1012. The UE 1005 is an example of the UEs 105, 200, and the base stations 1010, 1012 are examples of the gNBs 110*a-b* or ng-eNB 114. In general, TDOA positioning techniques utilize the difference in travel times between one entity and other entities to determine relative ranges from the other entities and those, combined with known locations of the other entities, may be used to determine the location of the one entity. Angles of arrival and/or departure may be used to help determine a location of an entity. For example, an angle of arrival or an angle of departure of a signal combined with a range between devices (determined using signal. e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). In operation, the first base station 1010 may provide a passive positioning start message 1002 to the UE 1005. The passive positioning start message 1002 may be a broadcast message, or other signaling such as RRC, to inform the UE of a PRS transmission schedule and may include transmission information (e.g., channel information, muting patterns, PRS bandwidth, PRS identification information, etc.). At time T1, the first station may transmit a first DL PRS 1004 which may be received by the second base station 1012 at time T2 (for example), and by the UE 1005 at time T3. The second base station 1012 may be configured to transmit a second DL PRS 1006 at time T4, which is received by the first base station 1010 at time T5 and by the UE 1005 at time T6. The time between T2 and T4 may be a configured turnaround time on the second base station 1012 and thus a known period of time. The time between T1 and T2 (i.e., time of flight) may also be known because the first and second base stations 1010, 1012 are in fixed locations. The turnaround time (i.e., T4–T2) and the time of flight (i.e., T2-T1) may be broadcast or otherwise provided to the UE 1005 for use in positioning calculations. The UE 1005 may observe the difference between T6 and T3, and the distances may be computed as:

$$D_{gNB1-UE} = c * ((T_3 - T_1)) \quad (3)$$

$$D_{gNB2-UE} = c * ((T_6 - T_1) - (T_4 - T_2) - (T_2 - T_1)) = c * (T_6 - T_4) \quad (4)$$

-continued $$D_{gNB2-UE} - D_{gNB1-UE} = c*((T_6 - T_3) - (T_4 - T_2) - (T_2 - T_1)) \quad (5)$$

In operation, in an example, the base stations 1010, 1012 may utilize synchronized timing to compute the time of flight values. In an example, the first DL PRS 1004 and the second DL PRS 1006 may include timing information (such as in the RTT message flow 900) and thus may reduce the impact of a timing offset between the stations.

Figure 11:
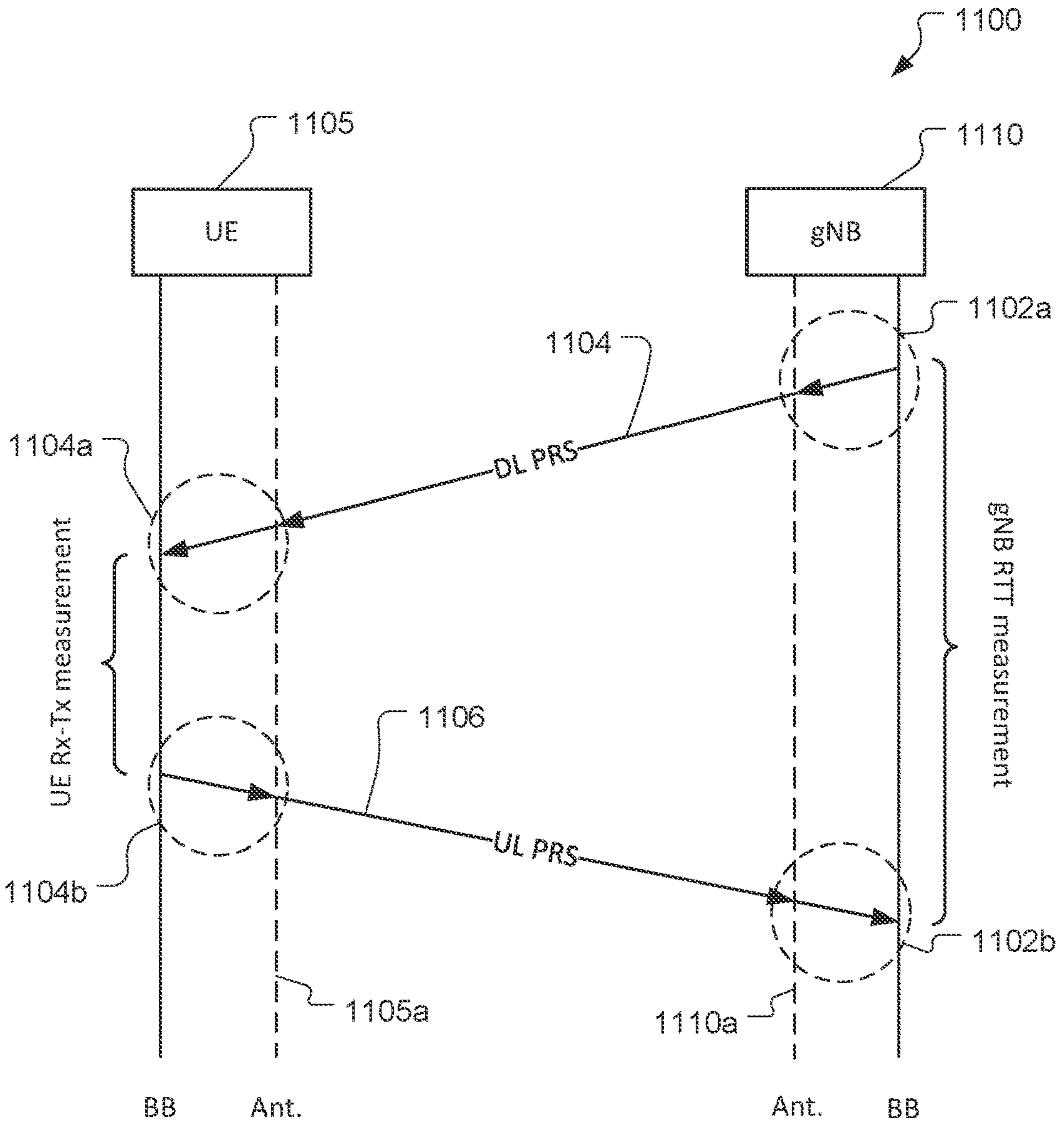
FIG. 11 is a diagram of example impacts of group delay errors in wireless transceivers.

Referring to FIG. 11, a diagram 1100 of example impacts of group delay errors within wireless transceivers are shown. The diagram 1100 depicts an example RTT exchange such as described in FIG. 9. A UE 1105, such as the UE 200, and a base station 1110, such as the gNB 110*a*, are exchanging positioning reference signals such as a downlink (DL) PRS 1104 and an uplink (UL) PRS 1106 (which may also be an UL SRS). The UE 1105 may have one or more antennas 1105*a* and associated base band processing components. Similarly, the base station 1110 may have one or more antennas 1110*a* and base band processing components. The respective internal configurations of the UE 1105 and the base station 1110 may cause delay times associated with the transmission and reception of PRS signals. In general, a group delay is a transit time of a signal through a device versus frequency. For example, a $BS_{TX}$ group delay 1102*a* represents the difference in time the base station 1110 records the transmission of the DL PRS 1104 and the time the signal leaves the antenna 1110*a*. A $BS_{RX}$ group delay 1102*b* represents the difference in time the UL PRS 1106 arrives at the antenna 110*a* and the time the processors in the base station 1110 receive an indication of the UL PRS 1106. The UE 1105 has similar group delays such as the $UE_{RX}$ group delay 1104*a* and the $UE_{RX}$ group delay 1104*b*. The group delays associated with the network stations may create a bottleneck for terrestrial based positioning because the resulting time differences lead to inaccurate position estimates. For example, a 10 nanosecond group delay error equates to approximately a 3 meter error in the position estimate. Different frequencies may have different group delay values in a transceiver, thus different PRS resources may have different group delays. The double difference positioning methods described herein may reduce the impact of the group delays associated with network stations through the use of one or more reference nodes configured to determine the errors associated with PRS resources transmitted by network stations.

Figure 12:
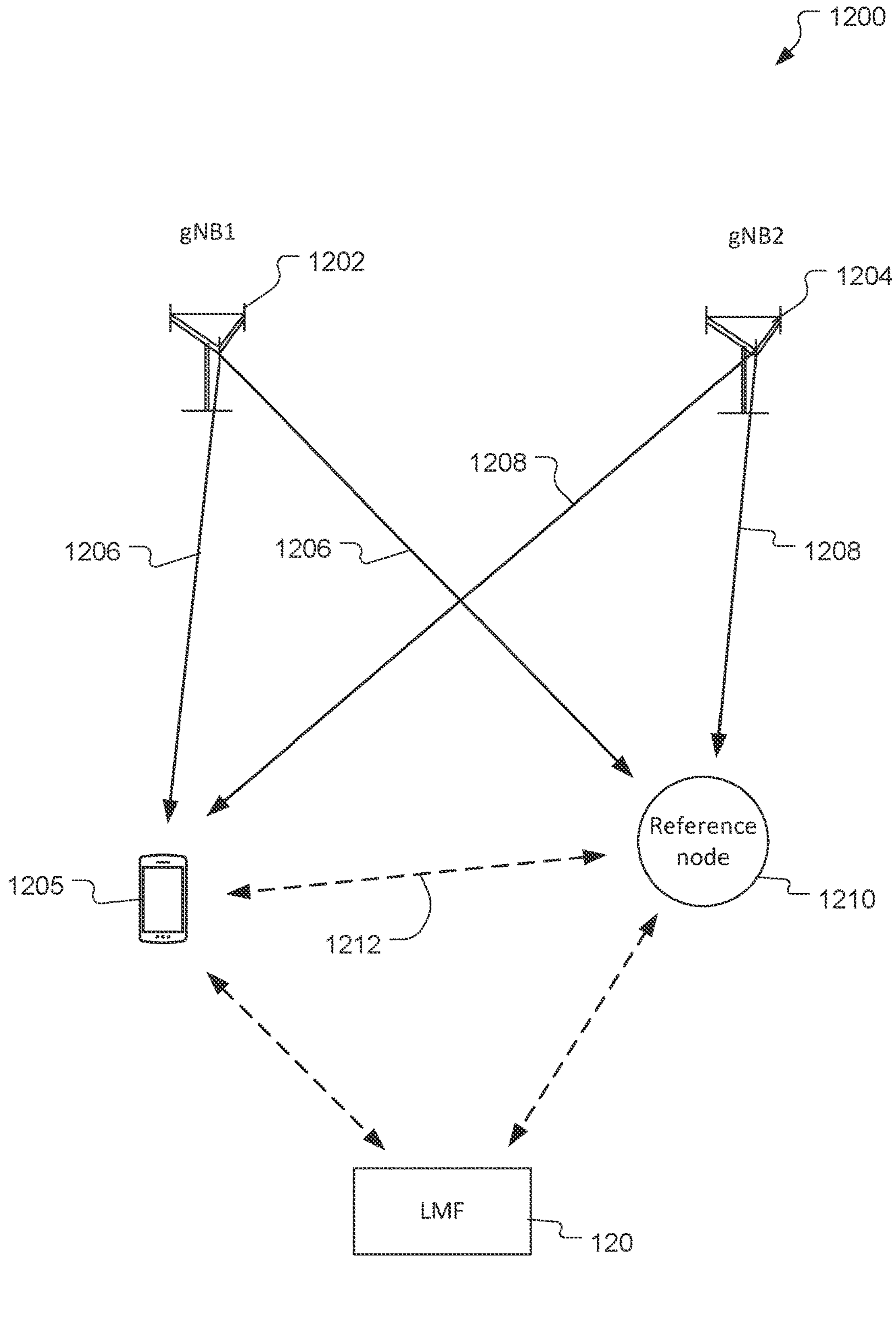
FIG. 12 is a diagram of an example double difference positioning method.

Referring to FIG. 12, a diagram 1200 of an example double difference positioning method is shown. The diagram 1200 includes a first base station 1202, a second base station 1204, a target UE 1205, and a reference node 1210. The base stations 1202, 1204 may be considered examples of the TRP 300, such as the gNBs 110*a*, 110*b*. The target UE 1205 may include at least some of the components of the UE 200 and may be considered an example of the UE 200. The reference node 1210 may include components of the UE 200 and/or the TRP 300 and may be an example of either a UE 200 or a TRP 300, or another device configured to communicate in the communication system 100. For example, the target UE 1205 and the reference node 1210 may be configured to communicate with a network entity such as the LMF 120 via one or more communication protocols. (e.g., via NRPPa, LPP, etc.). In an example, the target UE 1205 and the reference node 1210 may be configured to communicate via device-to-device (D2D) link 1212. The D2D link 1212 may be based on technologies such as NR sidelink (e.g., via the physical sidelink control channel (PSCCH), physical sidelink shared channel (PSSCH)). In a vehicle-to-every thing (V2X) network, the reference node 1210 may be a roadside unit (RSU), and the sidelink may be based on the PC5 protocol. Other D2D technologies may also be used.

In operation, the first base station 1202 is configured to transmit PRS resources such as a first PRS 1206 which is received by both the target UE 1205 and the reference node 1210. Preferably, the same instance of the first PRS 1206 received by the UE 1205 and reference node 1210, but different instances of the first PRS 1206 may be received by the UE 1205 and the reference node 1210. The second base station 1204 is configured to transmit PRS resources such as one or more instances of a second PRS 1208 which is received by both the target UE 1205 and the reference node 1210. The first and second PRS 1206, 1208 may be in the same or different positioning frequency layers. Since the reference node 1210 is in a known location, the expected time of arrivals (ToAs) and the reference signal timing difference (RSTD) for the first and second PRSs 1206, 1208 are known based on the propagation time of the RF signals. A delay in the actual measurements as compared to the expected ToAs may be used to determine the group delay associated with the PRSs 1206, 1208.

Figure 13:
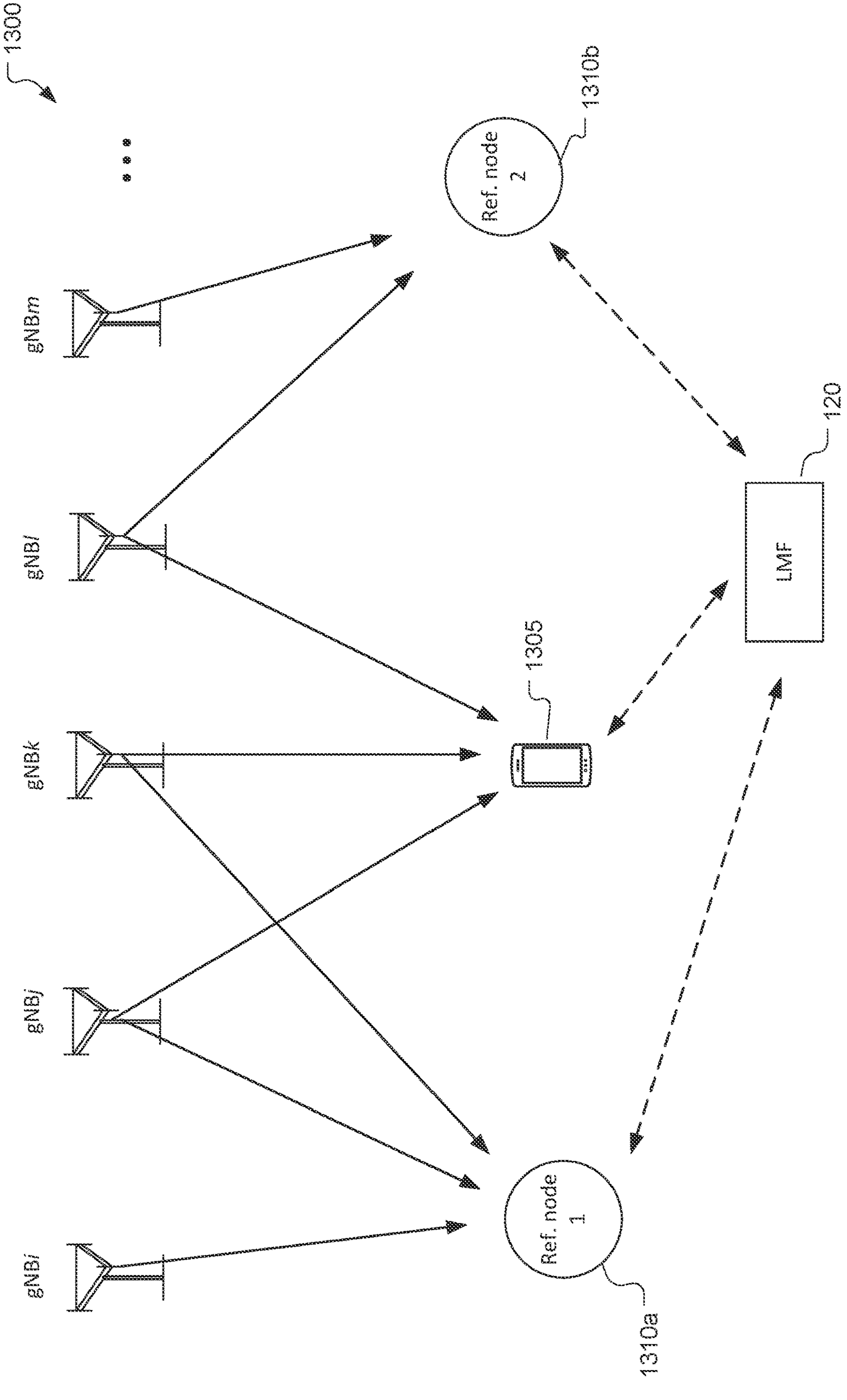
FIG. 13 is a diagram of reference node selection in an example wireless network.

Referring to FIG. 13, with further reference to FIG. 12, a diagram 1300 of reference node selection in an example wireless network is shown. The network includes a plurality of base stations gNBi-m, each of which may be an example of a TRP 300, a first reference node 1310*a*, a second reference node 1310*b*, and a target UE 1305. The first reference node 1310*a* is in a location to receive PRSs from a first set of the plurality of base stations, the first set including gNBi, gNBj and gNBk, and the second reference node 1310*b* is in a location to receive PRSs from a second set of the plurality of base stations, the second set including gNBl and gNBm. The target UE 1305 is currently located in a position to receive PRSs from a third set of the base stations, the third set including gNBj, gNBk and gNBj. The number of stations, locations of the reference nodes and received PRS are examples, and not limitations as other network stations and PRS may be used. For example, while the plurality of base stations are depicted as gNBs, other anchor stations may be configured to transmit PRSs. The anchor stations may be configured as base stations or other UEs. The plurality of base stations gNBi-m, the reference nodes 1310*a-b*, and the target UE 1305 may be configured to communicate with one or more location servers such as the LMF 120. The reference nodes 1310*a-b* may be combinations of any wireless nodes such as base stations (e.g., a gNB), UEs, TAB relays, etc., each of which is configured to support the double difference positioning method depicted in FIG. 12.

The LMF 120 may be configured to utilize different criteria for determining the PRS resources the reference nodes 1310*a-b* and the UE 1305 may receive. For example, the location of the UE 1305, and the locations of the reference nodes 1310*a-b* may be used to determine if they are within respective regions covered by PRS resources. The coverage may be interpreted as the PRS resource which may be measured, reported, or identified based on line-of-sight (LOS) measurements obtained by the reference nodes 1310*a-b*. Filtering (e.g., outlier removal) and other channel estimation/path loss techniques may be used to determine the LOS measurements.

In an example, the LMF 120 may be configured to select a reference node to obtain DD-TDOA measurements with a target UE based on a number of overlapped PRS measurements the reference node and the target UE may receive (i.e., the number of PRS that can be received by both the reference node and the target UE). For example, the target UE 1305 and the first reference node 1310*a* are located to receive PRS from gNBj and gNBk, and the target UE 1305 and the second reference node 1310*b* are configured to receive PRS from gNBl. In this example, the first reference node 1310*a* may be selected since it has a larger number of overlapping PRS with the UE 1305 then the second reference node 1310*b*. The selection of the first reference node 1310*a* in FIG. 13 is an example, and not a limitation. Other factors such as a location uncertainty associated with a reference node location may be included in the determination. For example, if the location of first reference node 1310*a* is an estimate which may be in error, if location estimations based on measurements obtained by the first reference node 1310*a* contain errors, and/or if the first reference node 1310*a* is in motion (e.g., a change in mobility status), then these factors may be weighted in the selection process to disfavor the selection of the first reference node 1310*a*. Other factors which may impact the accuracy of the ToA measurements with a reference node may also be considered.

In an example, the LMF 120 may evaluate the accuracy of a target UE positioning session. For example, the LMF 120 may be configured to detect timing errors, or determine other quality or accuracy metrics, of the DD-TDOA measurements obtained by a target UE—reference node pair. If the measurements include timing errors, or fail to meet established quality and/or accuracy requirements, the LMF 120 may provide an on-demand request to the target UE and/or the reference node and/or to other reference nodes to increase the number of PRS resources each station should attempt to measure. The increase in attempted PRS measurements may increase the overlapped measurements between the target UE and the reference node, which may also increase the number of overlapped LOS measurements. A larger overlap of LOS measurements may increase the accuracy of the target UE positioning session.

Figure 14A:
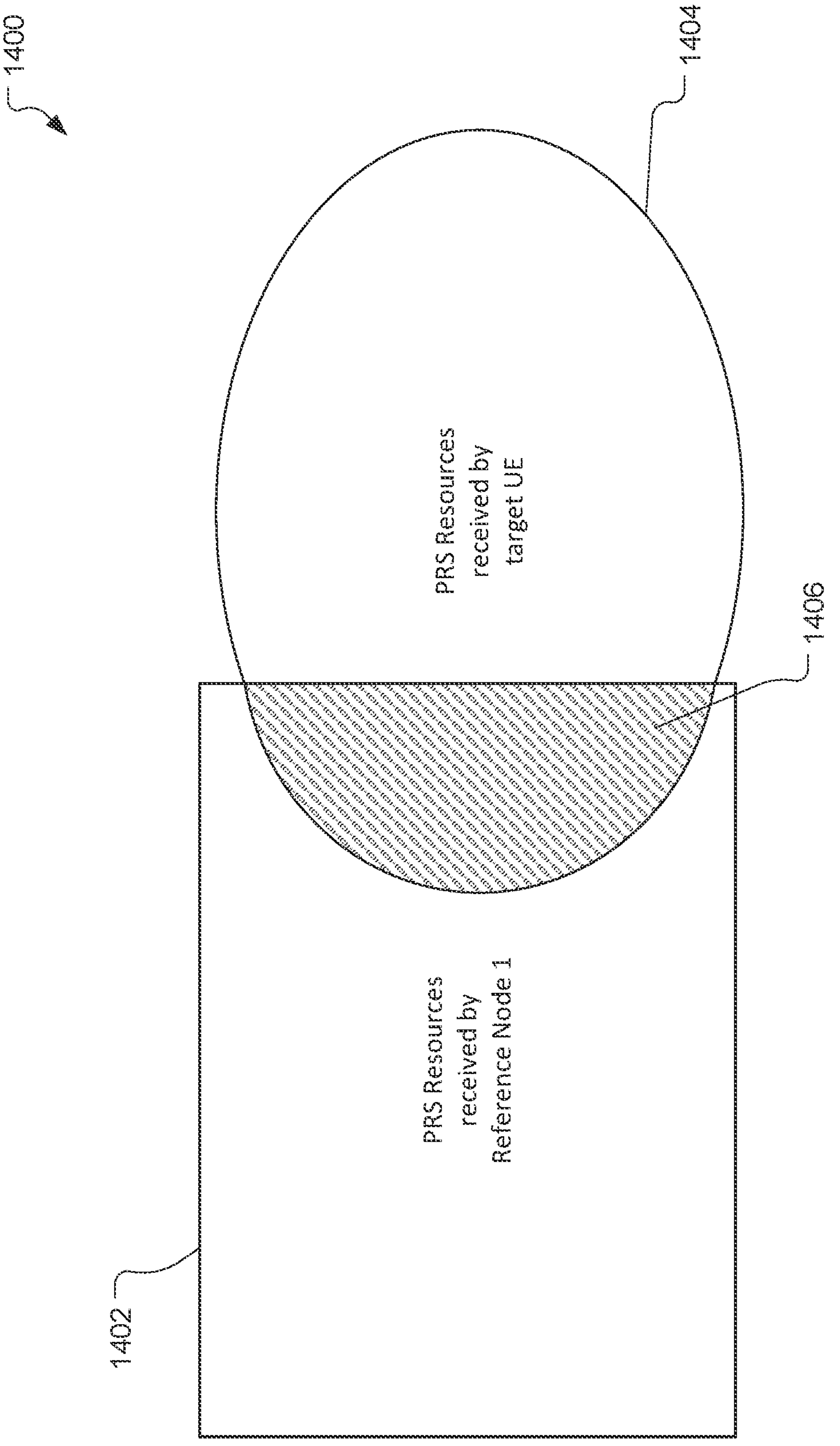
FIGS. 14A-14D are Venn diagrams of positioning reference signal resources for on-demand positioning reference signal selection.

Referring to FIGS. 14A-14D, with further reference to FIG. 13. Venn diagrams of positioning reference signal resources for on-demand positioning reference signal selection are shown. Referring to FIG. 14A, a first diagram 1400 represents a first set of PRS resources 1402 received by the first reference node 1310*a*, and a second set of PRS resources 1404 received by the target UE 1305. The PRS resources received by both the first reference node and the target UE are indicated in a first overlap area 1406. In operation, the PRS resources in the first overlap area 1406 may not have a sufficient number of LOS PRS resources to both the first reference node and the target UE, and the DD-TDOA measurements obtained by the first reference node 1310*a* and the target UE 1305 may be insufficient for computing a position estimate for the target UE.

Figure 14B:
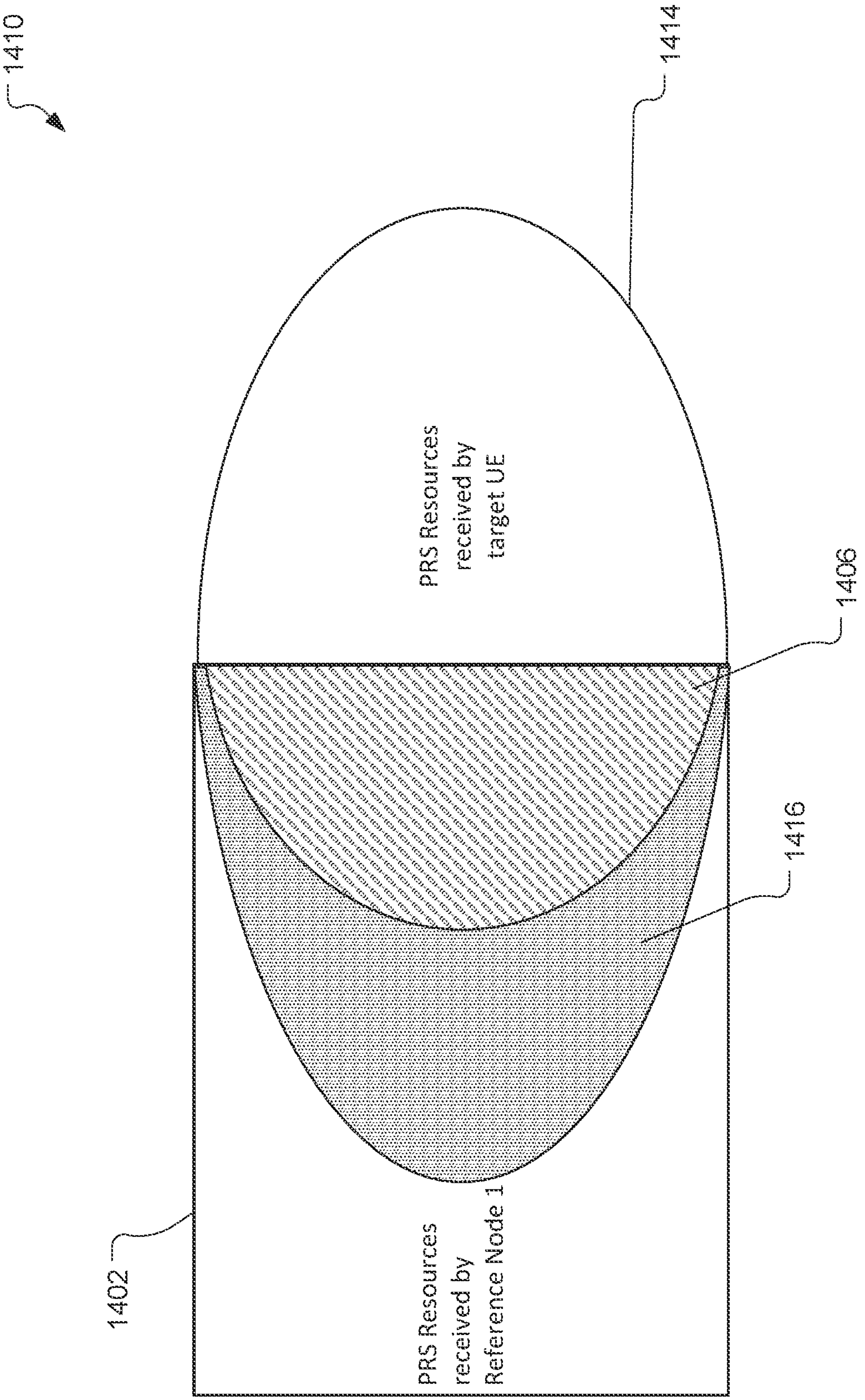

Referring to FIG. 14B, a second diagram 1410 represents the PRS resources received by the first reference node 1310*a* and the target UE 1305 after an example first on-demand request is provided by the LMF 120. The first on-demand request may include an indication of additional PRS resources the target UE 1305 may attempt to measure. The additional PRS resources in the first on-demand request may be based on the first set of PRS resources 1402 that may be received by the first reference node 1310*a*. As a result of receiving the first on-demand request, the target UE 1305 may receive a third set of PRS resources 1414, which includes more PRS resources than the second set of PRS resources 1404. In particular, the number of overlapping PRS resources with the first reference node 1310*a* may increase from the first overlap area 1406 to a second overlap area 1416. The increased number of PRS resources in the second overlap area 1416 may include an increased number of LOS PRS resources and the accuracy of the DD-TDOA may be sufficient for determining a positioning estimate for the target UE 1305.

Figure 14C:
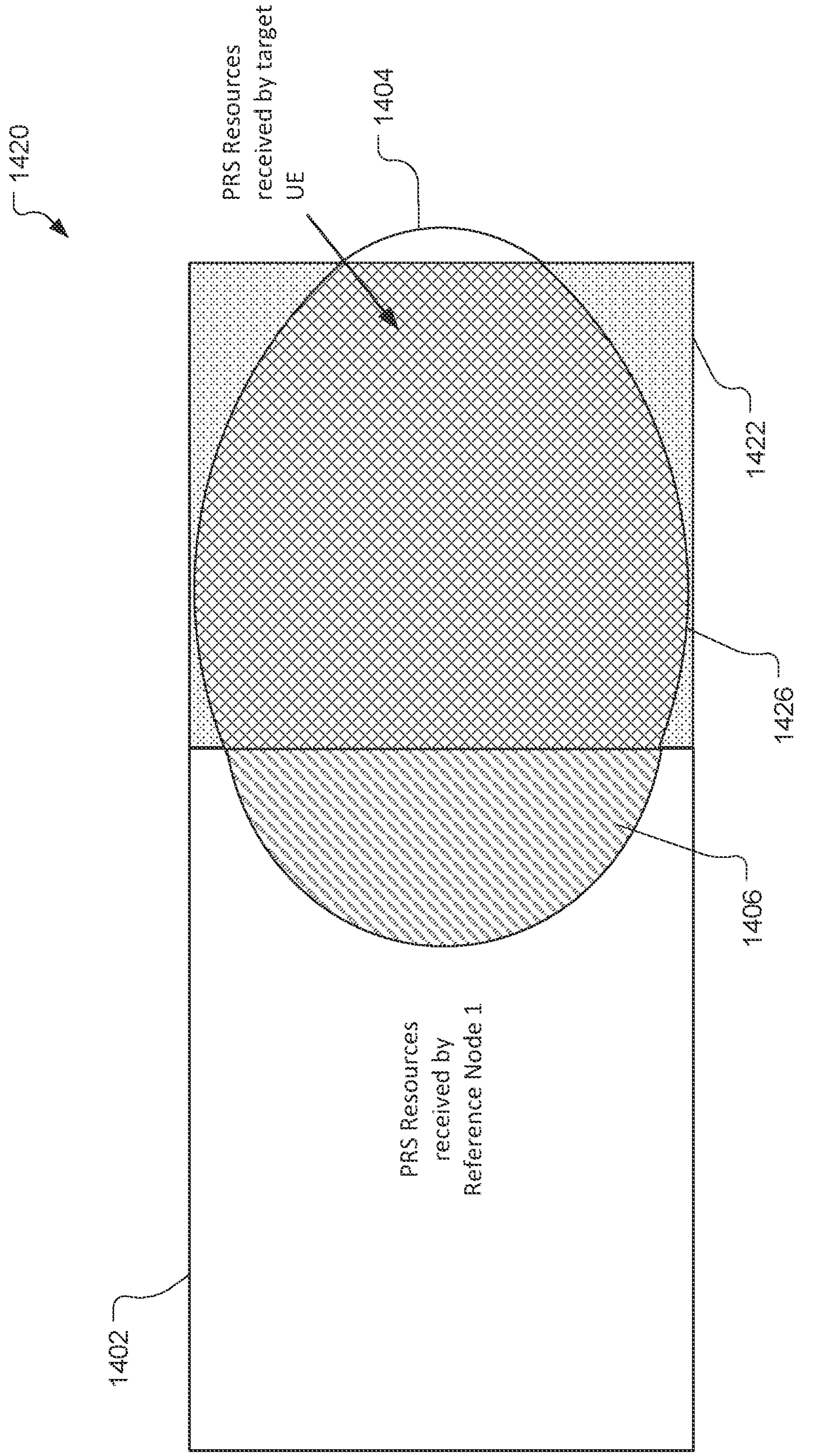

Referring to FIG. 14C, a third diagram 1420 represents the PRS resources received by the first reference node 1310*a* and the target UE 1305 after an example second on-demand request is provided by the LMF 120. The second on-demand request may include an indication of additional PRS resources the first reference node 1310*a* may attempt to capture. The additional PRS resources in the second on-demand request may be based on the second set of PRS resources 1404 that may be received by the target UE 1305. In an example, the first and second on-demand request may be sent simultaneously to the first reference node 1310*a* and the target UE 1305. As a result of receiving the second on-demand request, the first reference node 1310*a* may attempt to measure a fourth set of PRS resources 1422 (in addition to the first set of PRS resources 1402). Thus, a third overlap area 1426 may be included with the first overlap area 1406 to increase the potential number of LOS PRS resources received by both the first reference node 1310*a* and the target UE 1305.

Figure 14D:
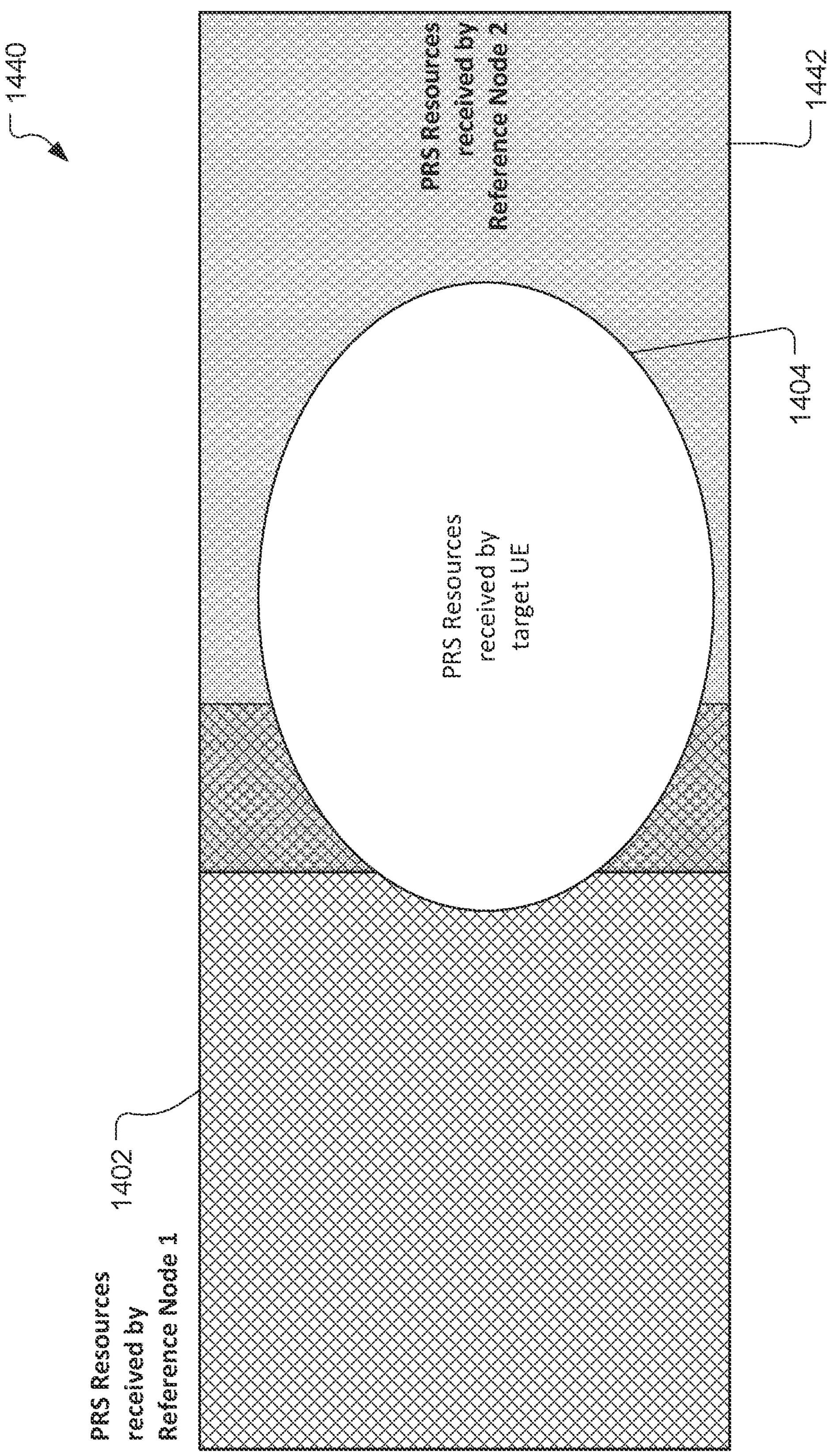

Referring to FIG. 14D, a fourth diagram 1440 represents the PRS resources received by the first reference node 1310*a*, the second reference node 1310*b*, and the target UE 1305 after an example third on-demand request is provided by the LMF 120. The third on-demand request may include an indication of additional PRS resources 1442 the second reference node 1310*b* may attempt to capture. The additional PRS resources in the third on-demand request may be based on the second set of PRS resources 1404 the target UE 1305 may receive. As a result of the third on-demand request, the overlap area between the target UE 1305 and the second reference node 1310*b* may include more LOS PRS resources than an overlap area between the target UE 1305 and the first reference node 1310*a*. As a result of the increased number of LOS measurements, the LMF 120 may utilize DD-TDOA measurements between the target UE 1305 and the second reference node 1310*b* for positioning estimates. The first, second and third on-demand requests may be sent sequentially, in parallel, or in various combinations in an effort to increase the number of LOS PRS resources and improve the resulting positioning accuracy.

Figure 15A:
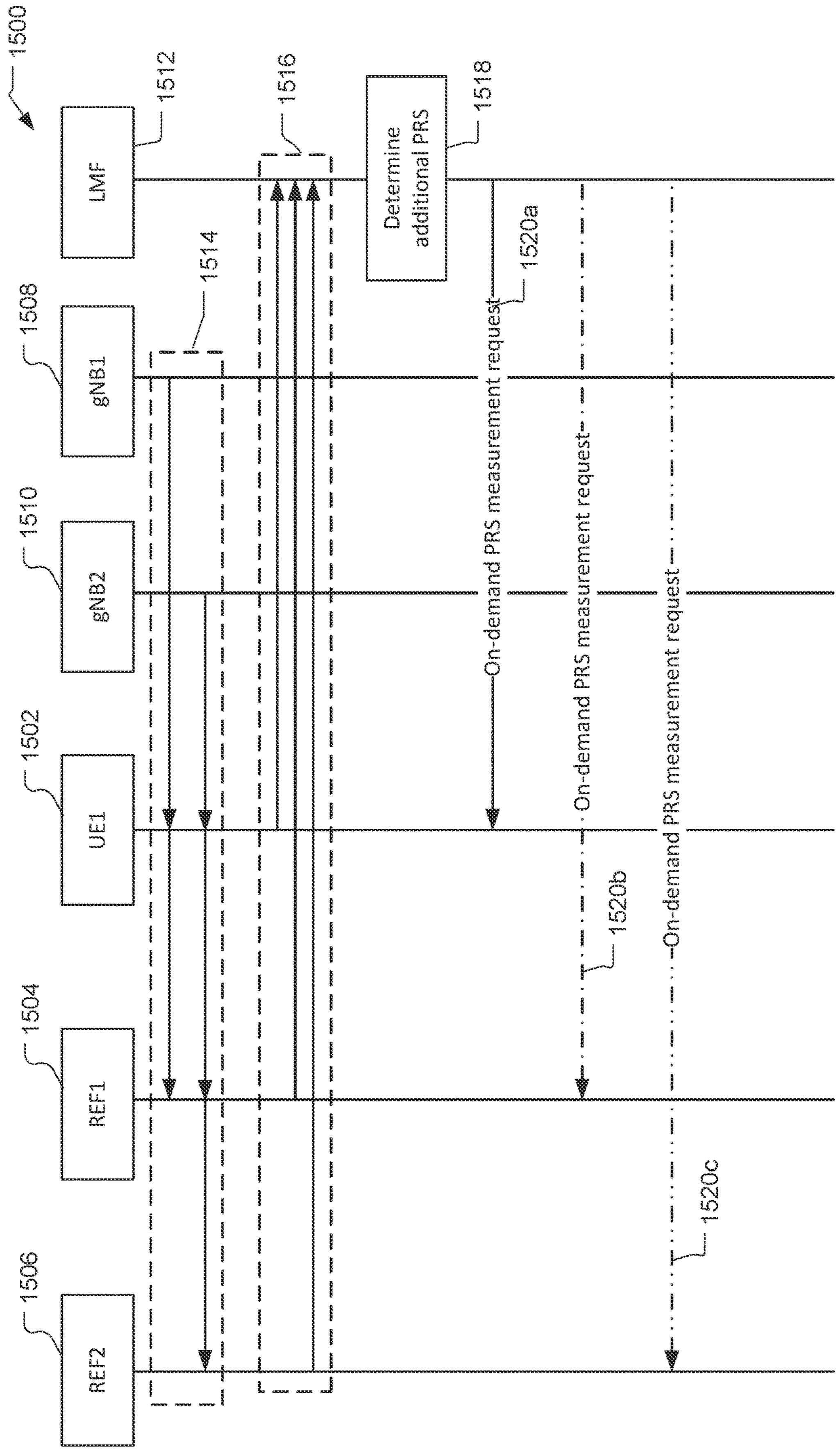
FIGS. 15A-15C are example message flow diagrams for on-demand positioning reference signal selection.
Figure 15B:
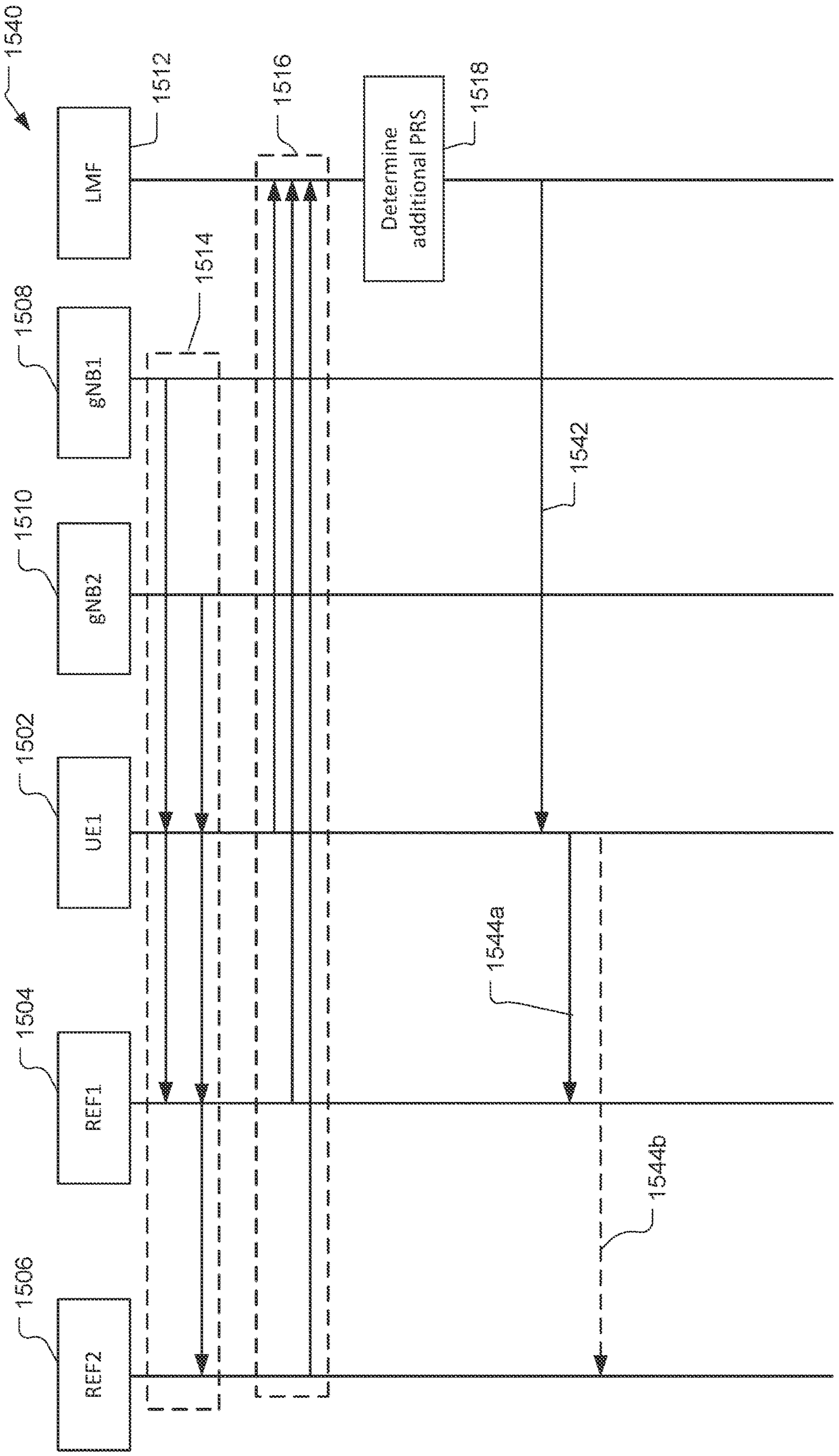
Figure 15C:
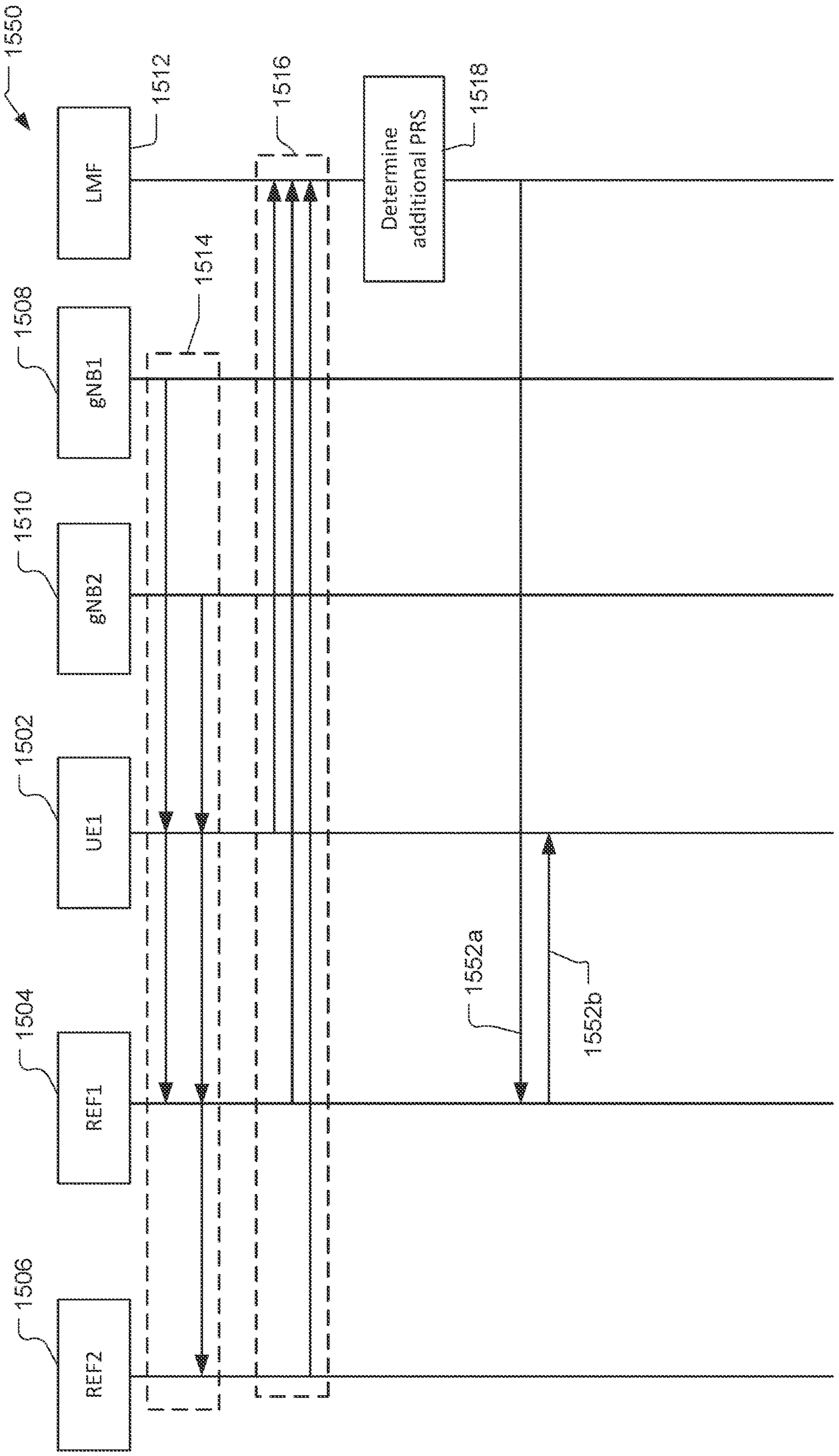

Referring to FIGS. 15A-15C, example message flow diagrams for on-demand positioning reference signal selection are shown. The diagrams include elements in a communication system 100 such as a target UE 1502, a first reference node 1504, and a second reference node 1506. The target UE 1502 may include at least some of the components of the UE 200 and may be considered an example of the UE 200. The first and second reference nodes 1504, 1506 may include components of the UE 200 and/or the TRP 300 and may be examples of either a UE 200 or a TRP 300, or other devices configured to communicate in the communication system 100. The diagrams include example base stations such as a first base station 1508 and a second base station 1510, and a network server 1512. The base stations 1508, 1510 may be considered examples of the TRP 300, such as the gNBs 110*a*, 110*b*, and the network server 1512 may be considered an example of the server 400, such as the LMF 120. In operation, the base stations 1508, 1510 are configured to transmit and receive PRS resources 1514, which may be configured at higher layers in the communication system 100. For example, the PRS resources 1514 may be associated with a PRS resource sets in a frequency layer 700. The target UE 1502 and the reference nodes 1504, 1506 may receive some of the PRS resources 1514 and provide PRS measurement reports 1516 to the LMF. The measurement reports 1516 may include RSTD, TOA, TDOA, RTT or other positioning measurements obtained based at least in part on one or more of the transmitted PRS resources 1514. The measurement reports may also include signal identification information to associate a transmit a PRS resource 1514 with a PRS measurement value in the PRS measurement reports 1516. For example, the signal identification information may include various combinations of the TRP identification information, PRS resource set identification information, and/or PRS resource identification information. Other values may also be used to associate a transmitted PRS with the measured values. In an example, the target UE 1502 and the reference nodes 1504, 1506 may utilize NAS (LPP/NPP), or other wireless protocols to provide the PRS measurement reports 1516. The timing and sequence of the transmitted PRS resources 1514 and the PRS measurement reports 1516 are examples, and not limitations as the timing and order of transmissions of PRS from different base stations, and the reporting messages from client stations may vary. Other messaging such as measurement requests, PRS configuration messages, and assistance data may also be included in the message flows.

At stage 1518, the network server 1512 is configured to determine whether additional (i.e., on-demand) PRS measurements may be required to determine the position of the target UE 1502. For example, the PRS measurement reports 1516 may contain ambiguous TDOA measurements due to NLOS signals or a lack of overlapping PRS resources between the target UE 1502 and the reference nodes 1504, 1506. In an example, the network server 1512 may be configured with one or more data structures including coverage areas associated with PRS resources transmitted by the base stations 1508, 1510. The PRS resources may be associated with one or more reference nodes which are in a position and configured to receive the PRS resources. The network server 1512 may also be configured to utilize a coarse location of the target UE 1502 to determine a set of PRS resources the target UE 1502 may be expected to receive. The network server 1512 may then determine an overlap based on the PRS resources the reference nodes 1504, 1506 may receive and the PRS resources the target UE 1502 may receive. The overlap may be based on other operational factors which may impact the ability of stations to receive PRS resources. For example, muting patterns, device capabilities (e.g., bandwidth, frequency), and measurement gap configurations may be used to identify and/or constrain the PRS resources in the overlap. The network server 1512 may determine a set of PRS resources in the overlap and generate one or more on-demand requests to instruct the target UE 1502 and/or one or more of the reference nodes 1504, 1506 to obtain measurements of additional PRS resources. In a first example message flow 1500, the network server 1512 may provide a first on-demand PRS measurement request message 1520*a* to the target UE 1502 configured to increase the number of PRS the UE 1502 should attempt to measure. For example, referring to FIG. 14B, the first on-demand PRS measurement request message 1520*a* may include assistance data associated with the PRS resources the first reference node 1504 may receive to increase the overlap of PRS (e.g., increase to the second overlap area 1416). In an example, the network server 1512 may provide a second on-demand PRS measurement request message 1520*b* to the first reference node 1504 configured to increase the number of PRS the first reference node 1504 should attempt to measure. For example, referring to FIG. 14C, the second on-demand PRS measurement request message 1520*b* may include assistance data associated with the PRS resources the target UE 1502 received (or is in a location to receive) to increase the overlap of PRS between the first reference node 1504 and the target UE 1502 (e.g., increase to the third overlap area 1426). In an example, the first and second on-demand PRS measurement request messages 1520*a-b* may be sent simultaneously to the first reference node 1504 and the target UE 1502. In an example, the network server 1512 may provide a third on-demand PRS measurement request message 1520*c* to the second reference node 1506 configured to indicate PRS the second reference node 1506 should attempt to measure. For example, referring to FIG. 14D, the third on-demand PRS measurement request message 1520*c* may include assistance data associated with the PRS resources the target UE 1502 may receive. The first, second, and third on-demand PRS measurement request messages 1520*a-c* may be sent sequentially, in parallel, or in various combinations in an effort to increase the number of LOS PRS resources and improve the resulting positioning accuracy. In an example, the on-demand PRS measurement request messages may utilize a network transport layer such as NAS LPP/NPP and/or NRPPA. Other messaging protocols may also be used. In an example, the overlapping PRS signals may be constrained based on time to reduce the time gap between measurements by the target UE and the reference nodes. For example, the overlapping PRS may be selected based at least in part on a time frame, or time window, in which the target UE and/or reference nodes may measure the overlapped PRS.

Referring to FIG. 15B, a second example message flow 1540 may utilize sidelink communications to propagate the on-demand PRS measurement request. The network server 1512 may determine additional PRS at stage 1518 as previously described and then provide a fourth on-demand PRS measurement request message 1542 to the target UE 1502. The fourth on-demand PRS measurement request message 1542 may include assistance data associated with PRS resources the target UE 1502 may attempt to receive. The fourth on-demand PRS measurement request message 1542 may also include assistance data associated with PRS resources other neighboring stations may attempt to receive. For example, the first and second reference nodes 1504, 1506 may be neighboring to target UE 1502 and configured to communicate via one or more D2D sidelinks. In an example, the target UE 1502 may receive the fourth on-demand PRS measurement request message 1542 via a first radio access technology (e.g., LTE, 5G. Uu interface), and then relay the contents of the fourth on-demand PRS measurement request message 1542 using a second radio access technology (e.g., D2D sidelink, WiFi, BT, etc.). For example, the target UE 1502 may send one or more sidelink messages such as a first sidelink message 1544*a* and a second sidelink message 1544*b* via a D2D interface such as PC5. In an example, the target UE 1502 may be configured to parse the fourth on-demand PRS measurement request message 1542 into one or more subsets of PRS resources associated with the neighboring stations. For example, the first sidelink message 1544*a* may include assistance data for a first subset of the PRS resources which may be received by the first reference node 1504, and the second sidelink message 1544*b* may include assistance data for a second set of PRS resources which may be received by the second reference node 1506. In an example, the fourth on-demand PRS measurement request message 1542 may include one or more information elements configured to enable the target UE 1502 to parse the assistance data based on the neighboring stations. For example, the neighboring reference stations may be configured with different PRS resource sets and different PRS identification information. The information elements may include different PRS identification information corresponding to the different PRS resource sets on the target UE and the neighboring reference nodes.

Referring to FIG. 15C, a third example message flow 1550 may utilize sidelink communications to propagate an on-demand PRS measurement request to the target UE 1502. The network server 1512 may determine additional PRS at stage 1518 as previously described and then provide a fifth on-demand PRS measurement request message 1552*a* to a reference node, such as the first reference node 1504. The fifth on-demand PRS measurement request message 1552*a* may include assistance data associated with PRS resources the target UE 1502 and/or the first reference node 1504 may attempt to receive. In an example, the first reference node 1504 may receive the fifth on-demand PRS measurement request message 1552*a* via a first radio access technology (e.g., LTE, 5G, Uu interface), and then relay some or all of the contents of the fifth on-demand PRS measurement request message 1552*a* using a second radio access technology (e.g., D2D sidelink, WiFi, BT, etc.). For example, the first reference node 1504 may send one or more sidelink messages 1552*b*. In an example, the first reference node 1504 may be configured to parse the fifth on-demand PRS measurement request message 1552*a* into one or more subsets of PRS resources associated with the target UE 1502, or other neighboring stations. In a V2X example, the first reference node 1504 may be a roadside unit (RSU) and may receive the fifth on-demand PRS measurement request message 1552*a* via a Uu interface and transmit the one or more sidelink messages 1552*b* via the PC5 interface. Other messaging protocols may also be used.

Figure 16:
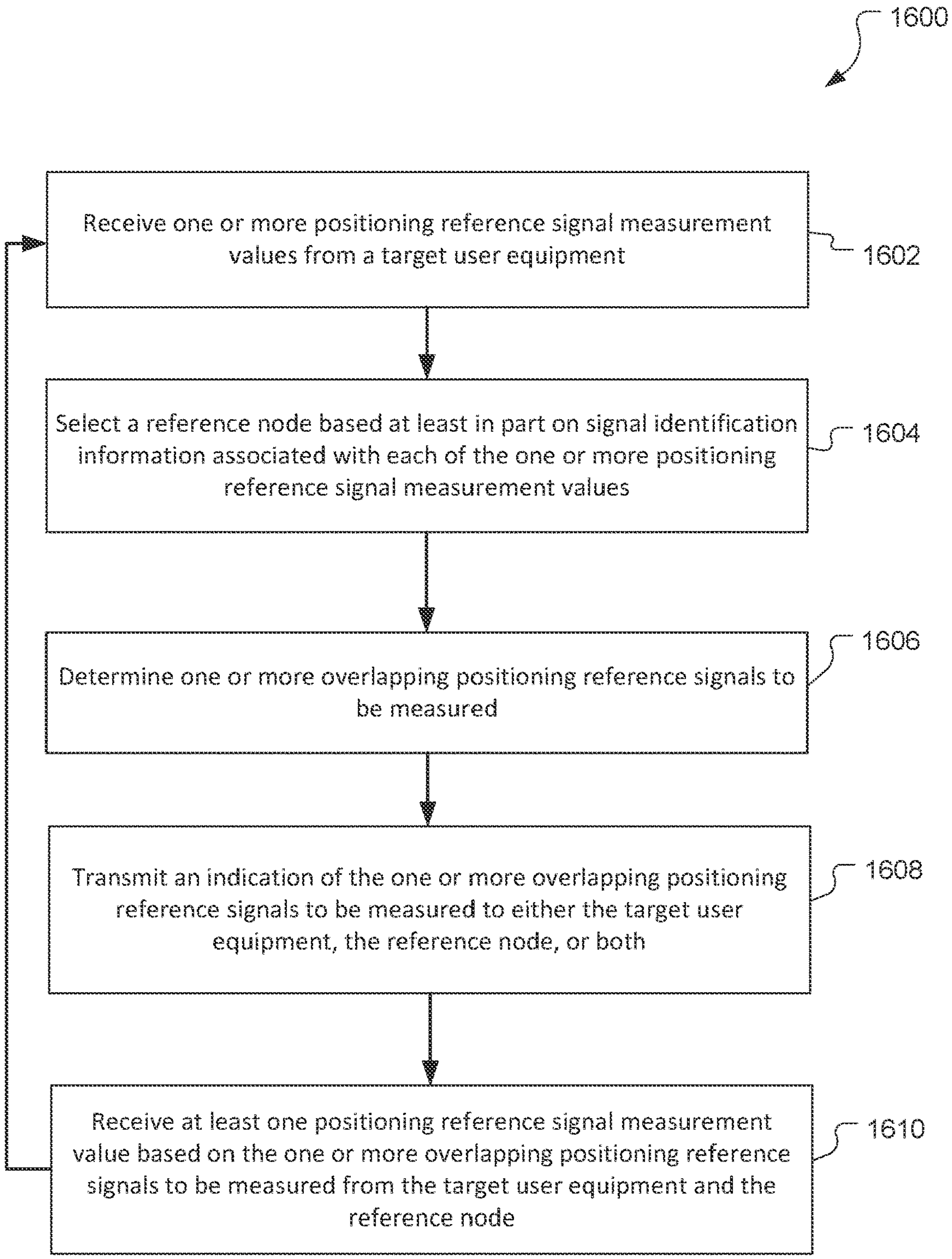
FIG. 16 is a process flow for a first example method for on-demand positioning reference signal selection.

Referring to FIG. 16, with further reference to FIGS. 1-15C, a first example method 1600 for on-demand positioning reference signal selection includes the stages shown. The method 1600 is, however, an example and not limiting. The method 1600 may be altered, e.g., by having stages added, removed, rearranged, combined, performed concurrently, and/or having single stages split into multiple stages.

At stage 1602, the method includes receiving one or more positioning reference signal measurement values from a target user equipment. A server 400, including a transceiver 415 and the processor 410, may be a means for receiving one or more PRS measurement values. In an example, referring to FIG. 15A, a network server 1512 such as the LMF 120 may receive PRS measurement values from a plurality of station such as the target UE 1502 and the reference nodes 1504, 1506. In an example, the base stations 1508, 1510 are configured to transmit PRS resources 1514, which may be configured at higher layers in the communication system 100. For example, the PRS resources 1514 may be associated with PRS resource sets in a frequency layer 700. The target UE 1502 and the reference nodes 1504, 1506 may receive some of the PRS resources 1514 and provide PRS measurement reports 1516 to the LMF. The measurement reports 1516 may include signal identification information and corresponding RSTD, TOA, TDOA, RTT, Rx-Tx time difference, or other positioning measurements obtained based at least in part on one or more of the transmitted PRS resources 1514. The signal identification information may include, for example, various combinations of the TRP identification information, PRS resource set identification information, and PRS resource identification, or other values to identify the measured PRS. In an example, the target UE 1502 and the reference nodes 1504, 1506 may utilize NAS (LPP/NPP), or other wireless protocols to provide the PRS measurement reports 1516.

At stage 1604, the method includes selecting a reference node based at least in part on signal identification information associated with each of the one or more positioning reference signal measurement values. The server 400, including the processor 410, may be a means for selecting a reference node. The network server 1512 may be configured to select a reference node to obtain DD-TDOA measurements with a target UE based on a number of overlapped PRS measurements the reference node and the target UE reported at stage 1602 (i.e., the number of PRS that were received by both the reference node and the target UE). In an example, the network server 1512 may be configured to determine an intersection of PRS received by the target UE 1502 and each of the reference nodes 1504, 1506. The reference node with the maximum number of intersected PRS may be selected. For example, referring to FIG. 13, the first reference node 1310*a* may report PRS measurements based on PRS transmitted from gNBi, gNBj, and gNBk. The target UE 1305 may report PRS measurements based on PRS transmitted by gNBj, gNBk and gNBl. The second reference node 1310*b* may report PRS measurements based on PRS transmitted by gNBl and gNBm. In this example, the first reference node 1310*a* may be selected since it reported a larger number of overlapping PRS with the UE 1305 as compared to the second reference node 1310*b*.

At stage 1606, the method includes determining one or more overlapping positioning reference signals to be measured. The server 400, including the processor 410, may be a means for determining one or more overlapping PRS to be measured. In an example, the network server 1512 may be configured with one or more data structures including coverage areas associated with PRS resources transmitted by the base stations 1508, 1510. The PRS resources may be associated with one or more reference nodes which are in a position and may (e.g., potentially) receive the PRS resources. The network server 1512 may also be configured to utilize a coarse location of the target UE 1502 to determine a set of PRS resources the target UE 1502 may potentially receive. The network server 1512 may then determine one or more overlapping PRS based on the intersection of the PRS resources received by the selected reference node, and the PRS resources the target UE may potentially receive. For example, referring to FIG. 14B, the overlapping PRS resources to be measured may include the PRS resources in the first overlap area 1406 and the second overlap area 1416. The network server 1512 may be configured to select the overlapping PRS based on other operational factors which may impact the ability of stations to receive PRS resources. For example, muting patterns, device capabilities (e.g., bandwidth, frequency), and measurement gap configurations may be used to identify and/or constrain the PRS resources in the overlap. In an example, the network server 1512 may be configured to determine the LOS path condition of a PRS (e.g., based on the boresight angle of the PRS resource) and the location of the transmitting base station (e.g., a gNB). The overlapping PRS resources may include the PRS resources with a LOS path condition between an anchor station, such as a base station or transmitting UE, and the target UE 1502.

At stage 1608, the method includes transmitting an indication of the one or more overlapping positioning reference signals to be measured to either the target user equipment, the reference node, or both. The server 400, including the transceiver 415 and the processor 410, may be a means for transmitting the indication of the one or more overlapping PRSs to be measured. In an example, the network server 1512 may send one or more on-demand PRS measurement request messages to the target UE 1502 and/or one or more reference nodes 1504, 1506. For example, the network server 1512 may determine a set of PRS resources in the overlap at stage 1606 and generate one or more on-demand requests to instruct the target UE 1502 and/or one or more of the reference nodes 1504, 1506 to obtain measurements of additional PRS resources. In an example, the on-demand request may include an indication of a time frame, or time window, in which the target UE 1502 and/or reference nodes may measure the PRS. The time window may help to reduce the time gap between measurements by the target UE and the reference nodes. Referring to the first example message flow 1500, the network server 1512 may provide indication of the one or more overlapping PRSs as the first on-demand PRS measurement request message 1520*a*. The indication of the one or more overlapping PRS may be assistance data including PRS resource information configured to enable the target UE 1502 to increase the number of PRS the UE 1502 may attempt to measure. For example, referring to FIG. 14B, the indication of the one or more overlapping PRS may include assistance data associated with some or all of the PRS resources 1402 the first reference node 1504 may receive. In an example, the network server 1512 may be configured to mute PRS transmissions from one or more base stations 1508, 1510 to reduce interference with the overlapping PRS. For example, a PRS muting pattern may be configured to provide the overlapping PRS priority over other PRS resources 1514 to reduce the potential of NLOS noise.

At stage 1610, the method includes receiving at least one positioning reference signal measurement value based on the one or more overlapping positioning reference signals to be measured from the target user equipment and the reference node. The server 400, including the transceiver 415 and the processor 410, may be a means for receiving at least one PRS measurement value. In an example, the target UE 1502 and the selected reference node (e.g., the first reference node 1504) may receive one or more of the PRS resources transmitted at stage 1608 and provide PRS measurement reports to the network server 1512. The measurement values may include signal identification information and corresponding RSTD, TOA, TDOA, RTT, Rx-Tx time difference, or other positioning measurement values to enable the network server to perform double differential measurements for the target UE and the selected reference node. In an example, the process may iterate back to stage 1602 to increase the number of LOS PRS measurements obtained by the target UE and the reference node, or additional reference nodes.

Figure 17:
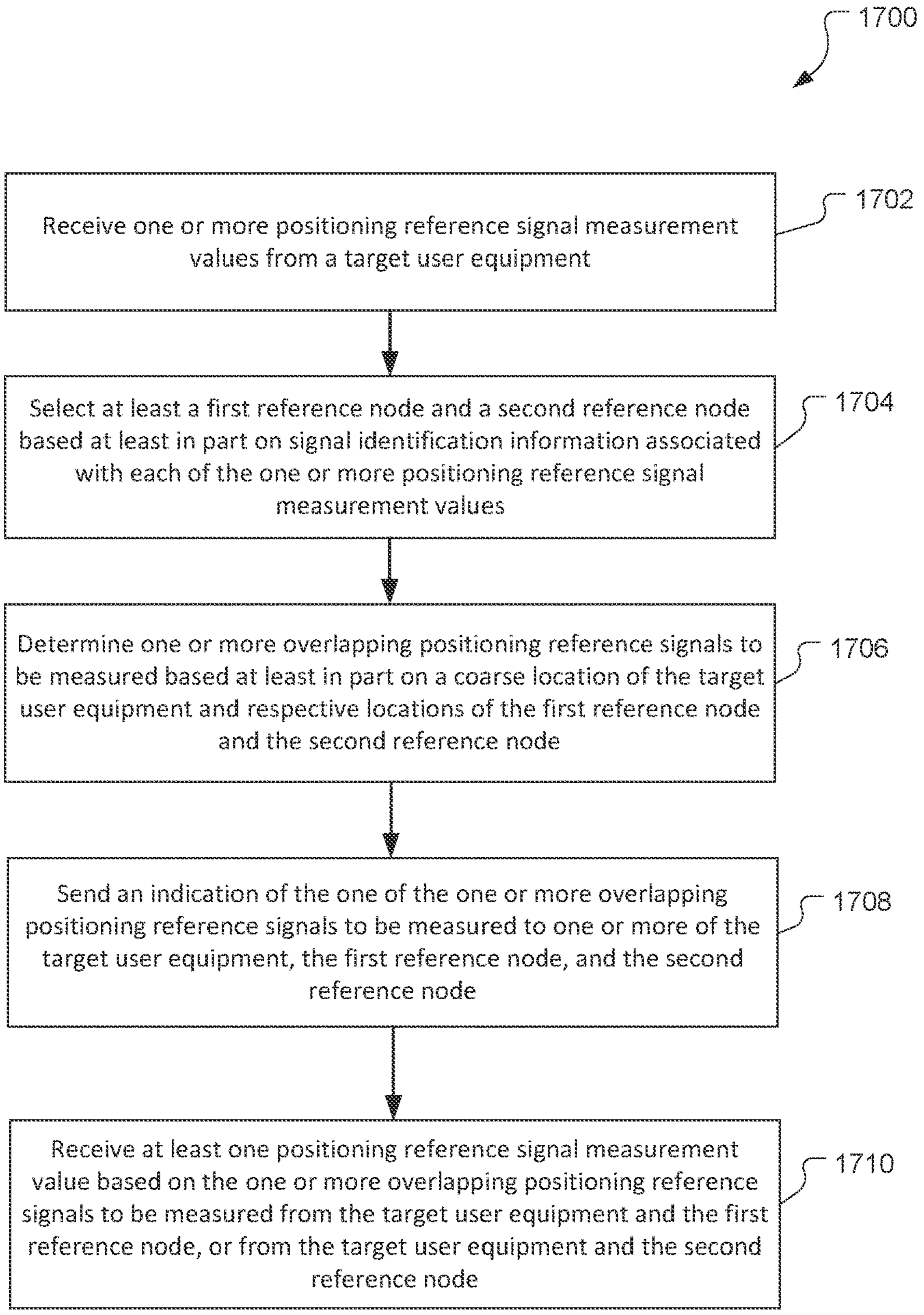
FIG. 17 is a process flow for a second example method for on-demand positioning reference signal selection.

Referring to FIG. 17, with further reference to FIGS. 1-15C, a second example method 1700 for on-demand positioning reference signal selection includes the stages shown. The method 1700 is, however, an example and not limiting. The method 1700 may be altered, e.g., by having stages added, removed, rearranged, combined, performed concurrently, and/or having single stages split into multiple stages.

At stage 1702, the method includes receiving one or more positioning reference signal measurement values from a target user equipment. A server 400, including a transceiver 415 and the processor 410, may be a means for receiving one or more PRS measurement values. In an example, referring to FIG. 15A, a network server 1512 such as the LMF 120 may receive PRS measurement values from a plurality of station such as the target UE 1502 and the reference nodes 1504, 1506. In an example, the base stations 1508, 1510 are configured to transmit PRS resources 1514, which may be configured at higher layers in the communication system 100. For example, the PRS resources 1514 may be associated with PRS resource sets in a frequency layer 700. The target UE 1502 and the reference nodes 1504, 1506 may receive some of the PRS resources 1514 and provide PRS measurement reports 1516 to the LMF. The measurement reports 1516 may include signal identification information and corresponding RSTD, TOA, TDOA, RTT, Rx-Tx time difference, or other positioning measurements obtained based at least in part on one or more of the transmitted PRS resources 1514. The signal identification information may include, for example, various combinations of the TRP identification information, PRS resource set identification information, and PRS resource identification, or other values to identify the measured PRS. In an example, the target UE 1502 and the reference nodes 1504, 1506 may utilize NAS (LPP/NPP), or other wireless protocols to provide the PRS measurement reports 1516.

At stage 1704, the method includes selecting at least a first reference node and a second reference node based at least in part on signal identification information associated with each of the one or more positioning reference signal measurement values. The server 400, including the processor 410, may be a means for selecting at least a first reference node and a second reference node. The network server 1512 may be configured to select a first reference node and a second reference node to obtain DD-TDOA measurements with a target UE based on a number of overlapped PRS measurements the respective reference nodes have with the target UE based on the PRS signal measurements reported at stage 1702. (i.e., the number of PRS that were received by both a respective reference node and the target UE). For example, referring to FIG. 14D, the first reference node and the second reference node may be selected based on the respective PRS resources received 1402, 1442 as compared to the PRS resources 1404 received by the target UE.

At stage 1706, the method includes determining one or more overlapping positioning reference signals to be measured based at least in part on a coarse location of the target user equipment and respective locations of the first reference node and the second reference node. The server 400, including the processor 410, may be a means for determining one or more overlapping PRS. In an example, the network server 1512 may be configured with one or more data structures including coverage areas associated with PRS resources transmitted by the base stations 1508, 1510. The PRS resources may be associated with one or more reference nodes which are in a position and may (e.g., potentially) receive the PRS resources. The network server 1512 may also be configured to utilize a coarse location of the target UE 1502 to determine a set of PRS resources the target UE 1502 may potentially receive. The network server 1512 may then determine one or more overlapping PRS based on the intersection of the PRS resources received by the first and second reference nodes, and the PRS resources received by the target UE. The network server 1512 may be configured to select the overlapping PRS based on other operational factors which may impact the ability of stations to receive PRS resources. For example, muting patterns, device capabilities (e.g., bandwidth, frequency), and measurement gap configuration may be used to identify and/or constrain the PRS resources in the overlap.

At stage 1708, the method includes transmitting an indication of the one or more overlapping positioning reference signals to be measured to one or more of the target user equipment, the first reference node, and the second reference node. The server 400, including the transceiver 415 and the processor 410, may be a means for transmitting the indication of the one or more overlapping PRSs. In an example, the network server 1512 may send one or more on-demand PRS measurement request messages to the target UE 1502 and/or one or more reference nodes 1504, 1506. For example, the network server 1512 may determine a set of PRS resources in the overlap at stage 1706 and generate one or more on-demand requests to instruct the target UE 1502 and/or one or more of the reference nodes 1504, 1506 to obtain measurements of additional PRS resources. Referring to the first example message flow 1500, the network server 1512 may provide an indication of the one or more overlapping PRSs as one or more on-demand PRS measurement request messages 1520*a-c*. The indication of the one or more overlapping PRS may be assistance data including PRS resource information configured to enable the target UE 1502 and the reference nodes 1504, 1506 to increase the number of LOS PRS resources to measure and report. In an example, the network server 1512 may be configured to mute PRS transmissions from one or more base stations 1508, 1510 to reduce interference with the overlapping PRS. For example, a PRS muting pattern may be configured to provide the overlapping PRS priority over other PRS resources 1514 to reduce the potential of NLOS noise.

At stage 1710, the method includes receiving at least one positioning reference signal measurement value based on the one or more overlapping positioning reference signals to be measured from the target user equipment and the first reference node, or from the target user equipment and the second reference node. The server 400, including the transceiver 415 and the processor 410, may be a means for receiving at least one PRS measurement value. In an example, the target UE 1502 and the first and second reference nodes may receive one or more of the PRS resources transmitted at stage 1708 and provide PRS measurement reports to the network server 1512. The measurement values may include signal identification information and corresponding RSTD, TOA, TDOA, RTT, Rx-Tx time difference, or other positioning measurement values to enable the network server to perform double differential measurements for the target UE and at least one of the first and second reference nodes.

Figure 18:
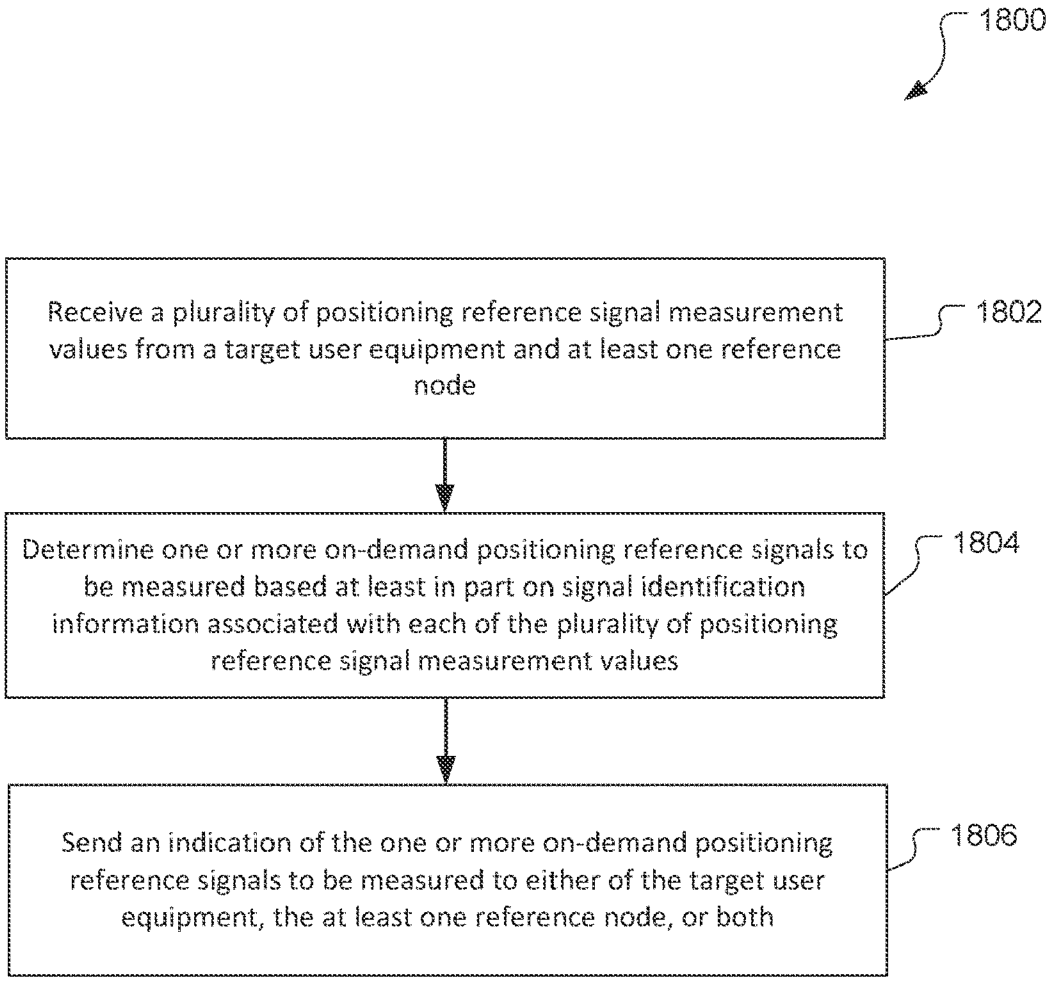
FIG. 18 is a process flow for an example method for providing an on-demand positioning reference signal request.

Referring to FIG. 18, with further reference to FIGS. 1-15C, an example method 1800 for providing an on-demand positioning reference signal measurement request includes the stages shown. The method 1800 is, however, an example and not limiting. The method 1800 may be altered, e.g., by having stages added, removed, rearranged, combined, performed concurrently, and/or having single stages split into multiple stages.

At stage 1802, the method includes receiving a plurality of positioning reference signal measurement values from a target user equipment and at least one reference node. A server 400, including a transceiver 415 and the processor 410, may be a means for receiving the plurality of PRS measurement values. In an example, referring to FIG. 15A, a network server 1512 such as the LMF 120 may receive PRS measurement values from a plurality of station such as the target UE 1502 and the reference nodes 1504, 1506. In an example, the base stations 1508, 1510 are configured to transmit PRS resources 1514, which may be configured at higher layers in the communication system 100. For example, the PRS resources 1514 may be associated with PRS resource sets in a frequency layer 700. The target UE 1502 and the reference nodes 1504, 1506 may receive some of the PRS resources 1514 and provide PRS measurement reports 1516 to the LMF. The measurement reports 1516 may include signal identification information and corresponding RSTD, TOA, TDOA, RTT, Rx-Tx time difference, or other positioning measurements obtained based at least in part on one or more of the transmitted PRS resources 1514. The signal identification information may include, for example, various combinations of the TRP identification information, PRS resource set identification information, and PRS resource identification, or other values to identify the measured PRS. In an example, the target UE 1502 and the reference nodes 1504, 1506 may utilize NAS (LPP/NPP), or other wireless protocols to provide the PRS measurement reports 1516.

At stage 1804, the method includes determining one or more on-demand positioning reference signals to be measured based at least in part on signal identification information associated with each of the plurality of positioning reference signal measurement values. The server 400, including the processor 410, may be a means for determining one or more on-demand PRSs to be measured. The network server 1512 may be configured select the at least one reference node based on the number of PRS measurements provided at stage 1802. For example, the reference node which provides the greatest number of PRS measurements, or the reference node with the most overlapped PRS with the target UE may be selected. Referring to FIG. 14A, for example, the first reference node (e.g., the at least one reference node) may report measurements based on the first set of PRS resources 1402, and the target UE may report measurements based on the second set of PRS resources 1404. The first reference node and the target UE may have a set of overlapping PRS resources, as depicted by the first overlap area 1406. In an example, the network server 1512 may utilize the signal identification information associated with the first set of PRS resources 1402 as the on-demand PRS. That is, the network server 1512 may request that the target UE attempt to measure the PRS in the first set of PRS resources 1402. In an example, the network server 1512 may utilize the signal identification information associated with the second set of PRS resources 1404 as the on-demand PRS. That is, the network server 1512 may request that the first reference node attempt to measure the PRS in the second set of PRS resources 1404. In an example, the on-demand PRS may include the PRS in both the first and second sets of PRS resources 1402, 1404.

At stage 1806, the method includes transmitting an indication of the one or more on-demand positioning reference signals to be measured to either the target user equipment, the at least one reference node, or both. The server 400, including the transceiver 415 and the processor 410, may be a means for transmitting the indication of the one or more on-demand PRSs to be measured. In an example, the network server 1512 may send one or more on-demand PRS measurement request messages to the target UE 1502 and/or one or more reference nodes 1504, 1506. For example, the network server 1512 may determine a set of PRS resources in the overlap at stage 1804 and generate one or more on-demand requests to instruct the target UE 1502 and/or one or more of the reference nodes 1504, 1506 to obtain measurements of additional PRS resources. In an example, the on-demand request may include an indication of a time frame, or time window, in which the target UE 1502 and/or reference nodes may measure the PRS. The time window may help to reduce the time gap between measurements by the target UE and the reference nodes. Referring to the first example message flow 1500, the network server 1512 may provide indication of the one or more overlapping PRSs as the first on-demand PRS measurement request message 1520*a*. The indication of the one or more overlapping PRS may be assistance data including PRS resource information configured to enable the target UE 1502 to increase the number of PRS the UE 1502 may attempt to measure. For example, referring to FIG. 14B, the indication of the one or more overlapping PRS may include assistance data associated with some or all of the PRS resources 1402 the first reference node 1504 may receive. In an example, the network server 1512 may be configured to mute PRS transmissions from one or more base stations 1508, 1510 to reduce interference with the overlapping PRS. For example, a PRS muting pattern may be configured to provide the overlapping PRS priority over other PRS resources 1514 to reduce the potential of NLOS noise, or other interference from other transmissions which may impact the measurements.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in the LMF 120 may be performed outside of the LMF 120 such as by the TRP 300 or the UE 200.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

A statement that a value exceeds (or is more than or above) a first threshold value is equivalent to a statement that the value meets or exceeds a second threshold value that is slightly greater than the first threshold value. e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value. e.g., the second threshold value being one value lower than the first threshold value in the resolution of a computing system.

Implementation examples are described in the following numbered clauses:

Clause 1. A method for providing an on-demand positioning reference signal request, comprising: receiving a plurality of positioning reference signal measurement values from a target user equipment and at least one reference node; determining one or more on-demand positioning reference signals to be measured based at least in part on signal identification information associated with each of the plurality of positioning reference signal measurement values; and sending an indication of the one or more on-demand positioning reference signals to be measured to either of the target user equipment, the at least one reference node, or both.

Clause 2. The method of clause 1 wherein at least one of the plurality of positioning measurement values received from the target user equipment and the at least one reference node includes a reference signal time difference value associated with a pair of positioning reference signals.

Clause 3. The method of clause 1 wherein at least one of the plurality of positioning measurement values received from the target user equipment and the at least one reference node includes a receive-transmit time difference of at least one positioning reference signal.

Clause 4. The method of clause 1 further comprising receiving at least one positioning reference signal measurement value from the target user equipment and the at least one reference node based on the one or more on-demand positioning reference signals to be measured.

Clause 5. The method of clause 4 further comprising determining that at least one measurement value of the at least one positioning reference signal measurement value based on the one or more on-demand positioning reference signals is based at least in part on a line of sight path condition between an anchor station and the target user equipment, and a line of sight path condition between the anchor station and the at least one reference node.

Clause 6. The method of clause 1 further comprising transmitting a positioning reference signal muting pattern to one or more anchor stations.

Clause 7. The method of clause 1 further wherein determining the one or more on-demand positioning reference signals to be measured includes constraining the one or more on-demand positioning reference signals based on a time window.

Clause 8. The method of clause 1 wherein the indication of the one or more on-demand positioning reference signals to be measured includes assistance data associated with one or more positioning reference signal resources.

Clause 9. A method for on-demand positioning reference signal selection, comprising: receiving one or more positioning reference signal measurement values from a target user equipment; selecting a reference node based at least in part on signal identification information associated with each of the one or more positioning reference signal measurement values; determining one or more overlapping positioning reference signals to be measured based at least in part on a coarse location of the target user equipment and a location of the reference node; transmitting an indication of the one or more overlapping positioning reference signals to be measured to either the target user equipment, the reference node, or both; and receiving at least one positioning reference signal measurement value based on the one or more overlapping positioning reference signals to be measured from the target user equipment and the reference node.

Clause 10. The method of clause 9 wherein the one or more positioning reference signal measurement values received from the target user equipment include a reference signal time difference value associated with a pair of positioning reference signals.

Clause 11. The method of clause 9 wherein the one or more positioning reference signal measurement values received from the target user equipment include a receive-transmit time difference of at least one positioning reference signal.

Clause 12. The method of clause 9 wherein determining the one or more overlapping positioning reference signals to be measured includes determining a line of sight path condition between an anchor station and the target user equipment.

Clause 13. The method of clause 9 further comprising receiving one or more positioning reference signal measurement values from the reference node, wherein selecting the reference node includes determining an intersection of the signal identification information associated with each of the positioning reference signal measurement values received from the target user equipment and the signal identification information associated with each of the positioning reference signal measurement values received from the reference node.

Clause 14. The method of clause 9 further comprising: receiving one or more positioning reference signal measurement values from a plurality of reference nodes; determining a plurality of intersection values based at least in part on the signal identification information associated with each of the positioning reference signal measurement values received by the target user equipment and the signal identification information associated with each of the positioning reference signal measurement values received by the plurality of reference nodes; and selecting the reference node based at least in part on the plurality of intersection values, wherein the reference node is associated with a maximum of the plurality of intersection values.

Clause 15. The method of clause 9 further comprising transmitting a positioning reference signal muting pattern to one or more wireless nodes based at least in part on the one or more overlapping positioning reference signals.

Clause 16. The method of clause 9 further comprising determining a time window for measuring at least one of the one or more overlapping positioning reference signals.

Clause 17. The method of clause 9 wherein the indication of the one or more overlapping positioning reference signals to be measured includes assistance data associated with one or more positioning reference signal resources.

Clause 18. The method of clause 9 further comprising determining that at least one measurement value of the at least one positioning reference signal measurement value based on the one or more overlapping positioning reference signals to be measured is based at least in part on a line of sight path condition between an anchor station and the target user equipment, and a line of sight path condition between the anchor station and the reference node.

Clause 19. An apparatus, comprising: a memory, at least one transceiver; at least one processor communicatively coupled to the memory and the at least one transceiver, and configured to: receive a plurality of positioning reference signal measurement values from a target user equipment and at least one reference node; determine one or more on-demand positioning reference signals to be measured based at least in part on signal identification information associated with each of the plurality of positioning reference signal measurement values; and send an indication of the one or more on-demand positioning reference signals to be measured to either of the target user equipment, the at least one reference node, or both.

Clause 20. The apparatus of clause 19 wherein at least one of plurality of positioning measurement values received from the target user equipment and the at least one reference node includes a reference signal time difference value associated with a pair of positioning reference signals.

Clause 21. The apparatus of clause 19 wherein at least one of the plurality of positioning measurement values received from the target user equipment and the at least one reference node includes a receive-transmit time difference of at least one positioning reference signal.

Clause 22. The apparatus of clause 19 wherein the at least one processor is further configured to receive at least one positioning reference signal measurement value based on the one or more on-demand positioning reference signals to be measured from the target user equipment and the at least one reference node.

Clause 23. The apparatus of clause 22 wherein the at least one positioning reference signal measurement value based on the one or more on-demand positioning reference signals to be measured includes at least one measurement value based at least in part on a line of sight path condition between an anchor station and the target user equipment, and a line of sight path condition between the anchor station and the at least one reference node.

Clause 24. The apparatus of clause 19 wherein the at least one processor is further configured to transmit a positioning reference signal muting pattern to one or more anchor stations based at least in part on the one or more on-demand positioning reference signals.

Clause 25. The apparatus of clause 19 wherein the at least one processor is further configured to determine a time window for measuring at least one of the one or more on-demand positioning reference signals.

Clause 26. The apparatus of clause 19 wherein the indication of the one or more on-demand positioning reference signals includes assistance data associated with one or more positioning reference signal resources.

Clause 27. An apparatus, comprising: a memory; at least one transceiver; at least one processor communicatively coupled to the memory and the at least one transceiver, and configured to: receive one or more positioning reference signal measurement values from a target user equipment; select a reference node based at least in part on signal identification information associated with each of the one or more positioning reference signal measurement values; determine one or more overlapping positioning reference signals to be measured based at least in part on a coarse location of the target user equipment and a location of the reference node; transmit an indication of the one or more overlapping positioning reference signals to be measured to either the target user equipment, the reference node, or both; and receive at least one positioning reference signal measurement value based on the one or more overlapping positioning reference signals to be measured from the target user equipment and the reference node.

Clause 28. The apparatus of clause 27 wherein the one or more positioning reference signal measurement values received from the target user equipment include a reference signal time difference value associated with a pair of positioning reference signals.

Clause 29. The apparatus of clause 27 wherein the one or more positioning reference signal measurement values received from the target user equipment include a receive-transmit time difference of at least one positioning reference signal.

Clause 30. The apparatus of clause 27 wherein the at least one processor is further configured to determine a line of sight path condition between an anchor station and the target user equipment.

Clause 31. The apparatus of clause 27 wherein the at least one processor is further configured to: receive one or more positioning reference signal measurement values from the reference node; and determine an intersection of the signal identification information associated with each of the positioning reference signal measurement values received from the target user equipment and the signal identification information associated with each of the positioning reference signal measurement values received from the reference node.

Clause 32. The apparatus of clause 27 wherein the at least one processor is further configured to: receive one or more positioning reference signal measurement values from a plurality of reference nodes; determine a plurality of intersection values based at least in part on the signal identification information associated with each of the positioning reference signal measurement values received by the target user equipment and the signal identification information associated with each of the positioning reference signal measurement values received by the plurality of reference nodes; and select the reference node based at least in part on the plurality of intersection values, wherein the reference node is associated with a maximum of the plurality of intersection values.

Clause 33. The apparatus of clause 27 wherein the at least one processor is further configured to transmit a positioning reference signal muting pattern to one or more base stations based at least in part on the one or more overlapping positioning reference signals.

Clause 34. The apparatus of clause 27 wherein the at least one processor is further configured to determine a time window for measuring at least one of the one or more overlapping positioning reference signals.

Clause 35. The apparatus of clause 27 wherein the indication of the one or more overlapping positioning reference signals to be measured includes assistance data associated with one or more positioning reference signal resources.

Clause 36. The apparatus of clause 27 wherein the at least one positioning reference signal measurement value based on the one or more overlapping positioning reference signals to be measured includes at least one measurement value based at least in part on a line of sight path condition between an anchor station and the target user equipment, and a line of sight path condition between the anchor station and the reference node.

Clause 37. An apparatus for providing an on-demand positioning reference signal request, comprising: means for receiving a plurality of positioning reference signal measurement values from a target user equipment and at least one reference node; means for determining one or more on-demand positioning reference signals to be measured based at least in part on signal identification information associated with each of the plurality of positioning reference signal measurement values; and means for sending an indication of the one or more on-demand positioning reference signals to be measured to either of the target user equipment, the at least one reference node, or both.

Clause 38. An apparatus for on-demand positioning reference signal selection, comprising: means for receiving one or more positioning reference signal measurement values from a target user equipment; means for selecting a reference node based at least in part on signal identification information associated with each of the one or more positioning reference signal measurement values; means for determining one or more overlapping positioning reference signals to be measured based at least in part on a coarse location of the target user equipment and a location of the reference node; means for transmitting an indication of the one or more overlapping positioning reference signals to be measured to either the target user equipment, the reference node, or both; and means for receiving at least one positioning reference signal measurement value based on the one or more overlapping positioning reference signals to be measured from the target user equipment and the reference node.

Clause 39. A non-transitory processor-readable storage medium comprising processor-readable instructions configured to cause one or more processors to provide an on-demand positioning reference signal request, comprising: code for receiving a plurality of positioning reference signal measurement values from a target user equipment and at least one reference node; code for determining one or more on-demand positioning reference signals to be measured based at least in part on signal identification information associated with each of the plurality of positioning reference signal measurement values; and code for sending an indication of the one or more on-demand positioning reference signals to be measured to either of the target user equipment, the at least one reference node, or both.

Clause 40. A non-transitory processor-readable storage medium comprising processor-readable instructions configured to cause one or more processors to select on-demand positioning reference signals, comprising: code for receiving one or more positioning reference signal measurement values from a target user equipment; code for selecting a reference node based at least in part on signal identification information associated with each of the one or more positioning reference signal measurement values; code for determining one or more overlapping positioning reference signals to be measured based at least in part on a coarse location of the target user equipment and a location of the reference node; code for transmitting an indication of the one or more overlapping positioning reference signals to be measured to either the target user equipment, the reference node, or both; and code for receiving at least one positioning reference signal measurement value based on the one or more overlapping positioning reference signals to be measured from the target user equipment and the reference node.

The invention claimed is:

1. A method for providing an on-demand positioning reference signal measurement request at a server, comprising:
- receiving, via at least one transceiver of the server, a plurality of positioning reference signal measurement values from a target user equipment and at least one reference node;
- determining one or more on-demand positioning reference signals to be measured based at least in part on signal identification information associated with each of the plurality of positioning reference signal measurement values;
- sending, via the at least one transceiver, an indication of the one or more on-demand positioning reference signals to be measured to either of the target user equipment, the at least one reference node, or both;
- receiving, via the at least one transceiver, a first positioning reference signal measurement value from the target user equipment and a second positioning reference signal measurement value from the at least one reference node based on the one or more on-demand positioning reference signals to be measured; and
- determining that the first positioning reference signal measurement value and the second positioning reference signal measurement value based respectively on a line of sight path condition between an anchor station and the target user equipment, and a line of sight path condition between the anchor station and the at least one reference node.

2. The method of claim 1, wherein at least one of the plurality of positioning reference signal measurement values received from the target user equipment and the at least one reference node includes a reference signal time difference value associated with a pair of positioning reference signals.

3. The method of claim 1, wherein at least one of the plurality of positioning reference signal measurement values received from the target user equipment and the at least one reference node includes a receive-transmit time difference of at least one positioning reference signal.

4. The method of claim 1, further comprising:
- transmitting a positioning reference signal muting pattern to one or more anchor stations.

5. The method of claim 1, wherein determining the one or more on-demand positioning reference signals to be measured comprises:
- constraining the one or more on-demand positioning reference signals to be measured based on a time window.

6. The method of claim 1, wherein the indication of the one or more on-demand positioning reference signals to be measured includes assistance data associated with one or more positioning reference signal resources.

7. A method for on-demand positioning reference signal selection at a server, comprising:
- receiving, via at least one transceiver of the server, one or more positioning reference signal measurement values from a target user equipment;
- selecting a reference node based at least in part on signal identification information associated with each of the one or more positioning reference signal measurement values;
- determining one or more overlapping positioning reference signals to be measured;
- transmitting, via the at least one transceiver, an indication of the one or more overlapping positioning reference signals to be measured to either the target user equipment, the reference node, or both; and
- receiving, via the at least one transceiver, at least one additional positioning reference signal measurement value based on the one or more overlapping positioning reference signals to be measured from the target user equipment and the reference node.

8. The method of claim 7, wherein the one or more positioning reference signal measurement values received from the target user equipment include a reference signal time difference value associated with a pair of positioning reference signals.

9. The method of claim 7, wherein the one or more positioning reference signal measurement values received from the target user equipment include a receive-transmit time difference of at least one positioning reference signal.

10. The method of claim 7, wherein determining the one or more overlapping positioning reference signals to be measured comprises:
- determining a coarse location of the target user equipment, and a line of sight path condition between an anchor station and the target user equipment.

11. The method of claim 7, further comprising:
- receiving one or more positioning reference signal measurement values from the reference node, wherein selecting the reference node comprises determining an intersection of the signal identification information associated with each of the one or more positioning reference signal measurement values received from the target user equipment and the signal identification information associated with each of the one or more positioning reference signal measurement values received from the reference node.

12. The method of claim 7, further comprising:
- receiving one or more positioning reference signal measurement values from a plurality of reference nodes;

determining a plurality of intersection values based at least in part on the signal identification information associated with each of the one or more positioning reference signal measurement values received by the target user equipment and the signal identification information associated with each of the one or more positioning reference signal measurement values received by the plurality of reference nodes; and selecting the reference node based at least in part on the plurality of intersection values, wherein the reference node is associated with a maximum of the plurality of intersection values.

13. The method of claim 7, further comprising:

transmitting a positioning reference signal muting pattern to one or more wireless nodes based at least in part on the one or more overlapping positioning reference signals to be measured.

14. The method of claim 7, further comprising:

determining a time window for measuring at least one of the one or more overlapping positioning reference signals.

15. The method of claim 7, wherein the indication of the one or more overlapping positioning reference signals to be measured includes assistance data associated with one or more positioning reference signal resources.

16. The method of claim 7, further comprising:

determining that at least one measurement value of the at least one additional positioning reference signal measurement value based on the one or more overlapping positioning reference signals to be measured is based at least in part on a line of sight path condition between an anchor station and the target user equipment, and a line of sight path condition between the anchor station and the reference node.

17. An apparatus at a server, comprising:

at least one memory;

at least one transceiver;

at least one processor communicatively coupled to the at least one memory and the at least one transceiver, and configured to:

receive, via the at least one transceiver, a plurality of positioning reference signal measurement values from a target user equipment and at least one reference node;

determine one or more on-demand positioning reference signals to be measured based at least in part on signal identification information associated with each of the plurality of positioning reference signal measurement values;

send, via the at least one transceiver, an indication of the one or more on-demand positioning reference signals to be measured to either of the target user equipment, the at least one reference node, or both;

receive, via the at least one transceiver, a first positioning reference signal measurement value from the target user equipment and a second positioning reference signal measurement value from the at least one reference node based on the one or more on-demand positioning reference signals to be measured; and determine that the first positioning reference signal measurement value and the second positioning reference signal measurement value based respectively on a line of sight path condition between an anchor station and the target user equipment, and a line of sight path condition between the anchor station and the at least one reference node.

18. The apparatus of claim 17, wherein at least one of the plurality of positioning reference signal measurement values received from the target user equipment and the at least one reference node includes a reference signal time difference value associated with a pair of positioning reference signals.

19. The apparatus of claim 17, wherein at least one of the plurality of positioning reference signal measurement values received from the target user equipment and the at least one reference node includes a receive-transmit time difference of at least one positioning reference signal.

20. The apparatus of claim 17, wherein the at least one processor is further configured to:

transmit a positioning reference signal muting pattern to one or more anchor stations based at least in part on the one or more on-demand positioning reference signals to be measured.

21. The apparatus of claim 17, wherein the indication of the one or more on-demand positioning reference signals to be measured includes assistance data associated with one or more positioning reference signal resources.

22. An apparatus at a server, comprising:

at least one memory;

at least one transceiver;

at least one processor communicatively coupled to the at least one memory and the at least one transceiver, and configured to:

receive, via the at least one transceiver, one or more positioning reference signal measurement values from a target user equipment;

select a reference node based at least in part on signal identification information associated with each of the one or more positioning reference signal measurement values;

determine one or more overlapping positioning reference signals to be measured based at least in part on a coarse location of the target user equipment and a location of the reference node;

transmit, via the at least one transceiver, an indication of the one or more overlapping positioning reference signals to be measured to either the target user equipment, the reference node, or both; and receive, via the at least one transceiver, at least one additional positioning reference signal measurement value based on the one or more overlapping positioning reference signals to be measured from the target user equipment and the reference node.

23. The apparatus of claim 22, wherein the one or more positioning reference signal measurement values received from the target user equipment include a reference signal time difference value associated with a pair of positioning reference signals.

24. The apparatus of claim 22, wherein the one or more positioning reference signal measurement values received from the target user equipment include a receive-transmit time difference of at least one positioning reference signal.

25. The apparatus of claim 22, wherein the at least one processor is further configured to:

receive one or more positioning reference signal measurement values from the reference node; and determine an intersection of the signal identification information associated with each of the one or more positioning reference signal measurement values received from the target user equipment and the signal identification information associated with each of the one or more positioning reference signal measurement values received from the reference node.

26. The apparatus of claim 22, wherein the at least one processor is further configured to:

receive one or more positioning reference signal measurement values from a plurality of reference nodes;

determine a plurality of intersection values based at least in part on the signal identification information associated with each of the one or more positioning reference signal measurement values received by the target user equipment and the signal identification information associated with each of the one or more positioning reference signal measurement values received by the plurality of reference nodes; and select the reference node based at least in part on the plurality of intersection values, wherein the reference node is associated with a maximum of the plurality of intersection values.

27. The apparatus of claim 22, wherein the at least one processor is further configured to:

transmit a positioning reference signal muting pattern to one or more base stations based at least in part on the one or more overlapping positioning reference signals to be measured.

28. The apparatus of claim 22, wherein the at least one processor is further configured to;

determine a time window for measuring at least one of the one or more overlapping positioning reference signals to be measured.

* * * * *